US009355499B1

(12) United States Patent
Johnson

(10) Patent No.: US 9,355,499 B1
(45) Date of Patent: *May 31, 2016

(54) AUGMENTED REALITY CONTENT FOR PRINT MEDIA

(71) Applicant: Kurt D. Johnson, St. Paul, MN (US)

(72) Inventor: Kurt D. Johnson, St. Paul, MN (US)

(73) Assignee: PopCards, LLC, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/819,170

(22) Filed: Aug. 5, 2015

Related U.S. Application Data

(63) Continuation-in-part of application No. 14/691,069, filed on Apr. 20, 2015, now Pat. No. 9,171,404.

(51) Int. Cl.
*H04N 5/228* (2006.01)
*G06T 19/00* (2011.01)
*G06T 11/60* (2006.01)
*H04N 5/232* (2006.01)

(52) U.S. Cl.
CPC ............... *G06T 19/006* (2013.01); *G06T 11/60* (2013.01); *H04N 5/232* (2013.01); *H04N 2201/3245* (2013.01)

(58) Field of Classification Search
CPC ..... H04N 9/083; H04N 5/2254; H04N 9/045; H04N 2201/3245; H04N 5/232; A61B 2019/5291; G05B 2219/32014; G05B 2219/39451; G05B 2219/39949; G06K 9/00671; H04M 2203/359; G06T 19/006; G06T 11/60
USPC ............................................ 348/222.1, 223.1
See application file for complete search history.

(56) References Cited

U.S. PATENT DOCUMENTS

| 5,062,229 | A | 11/1991 | Werjefelt |
| 7,480,422 | B2 | 1/2009 | Ackley et al. |
| 8,042,040 | B2 | 10/2011 | Lynton |
| 8,433,336 | B2 | 4/2013 | Lee et al. |

(Continued)

FOREIGN PATENT DOCUMENTS

CA 2246079 A1 3/2000

OTHER PUBLICATIONS

Dropbox—How do I use Camera Upload?, Mar. 8, 2013, available Online at http://www.dropbox.com/help/289, retrieved Apr. 19, 2015, 2 pages.
dvdvideosoft.com, "Free Video Software: Download free Video to JPG Converter—make snapshots . . . ," Mar. 23, 2013, available Online at: http://www.dvdvideosoft.com/products/dvd/Free-Video-to-JPG-Converter.htm#. VTQaszqmeOJ, retrieved Apr. 19, 2015, 4 pages.

(Continued)

*Primary Examiner* — Yogesh Aggarwal
(74) *Attorney, Agent, or Firm* — Krenz Patent Law, LLC

(57) ABSTRACT

A computer-implemented method includes: receiving, at a mobile computing device that includes a camera, an input that specifies one or more dimensions for a photograph to be included with a print media item; determining an aspect ratio based on the received input and presenting, on a display screen of the mobile computing device, a camera viewer with an aspect ratio that matches the determined aspect ratio; capturing, via the camera of the mobile computing device, a photograph at a first resolution, where an aspect ratio of the captured photograph matches the determined aspect ratio; uniquely associating the recorded video with the captured photograph, and transmitting, for receipt by a remote computer system, the captured photograph at the first resolution, the recorded video at the second resolution, and an indication of the unique association between the recorded video and the captured photograph, via a transmitter of the mobile computing device.

20 Claims, 14 Drawing Sheets

(56) References Cited

U.S. PATENT DOCUMENTS

| | | |
|---|---|---|
| 8,547,401 B2 | 10/2013 | Mallinson et al. |
| 8,589,314 B2 | 11/2013 | Friedman |
| 8,726,548 B2 | 5/2014 | Larson et al. |
| 8,736,429 B2 | 5/2014 | Lien et al. |
| 8,751,474 B2 | 6/2014 | Ogilvie et al. |
| 2001/0039206 A1 | 11/2001 | Peppel |
| 2005/0152002 A1 | 7/2005 | Shirakawa et al. |
| 2009/0070213 A1 | 3/2009 | Miller et al. |
| 2009/0202114 A1 | 8/2009 | Morin et al. |
| 2010/0138506 A1 | 6/2010 | Van |
| 2011/0201362 A1 | 8/2011 | Bregman-Amitai et al. |
| 2011/0209365 A1 | 9/2011 | Marsh et al. |
| 2011/0247247 A1 | 10/2011 | Mayer et al. |
| 2012/0022924 A1 | 1/2012 | Runnels et al. |
| 2012/0077470 A1 | 3/2012 | Kim et al. |
| 2012/0102398 A1* | 4/2012 | Cok .................. G06T 11/60 715/274 |
| 2012/0232968 A1 | 9/2012 | Calman et al. |
| 2012/0271732 A1 | 10/2012 | Glass et al. |
| 2012/0282905 A1 | 11/2012 | Owen |
| 2013/0042508 A1 | 2/2013 | Mayes |
| 2013/0147838 A1 | 6/2013 | Small et al. |
| 2013/0211970 A1 | 8/2013 | Glass et al. |
| 2013/0212453 A1 | 8/2013 | Gudai et al. |
| 2013/0222426 A1 | 8/2013 | Hymel |
| 2013/0332308 A1 | 12/2013 | Linden et al. |
| 2014/0076965 A1 | 3/2014 | Becorest et al. |
| 2014/0108136 A1 | 4/2014 | Zhao et al. |
| 2014/0125699 A1 | 5/2014 | Lotto et al. |
| 2014/0160157 A1 | 6/2014 | Poulos et al. |
| 2014/0187201 A1 | 7/2014 | Saatchi et al. |

OTHER PUBLICATIONS

Hallmark, "Augmented Reality | Hallmark Cards," Aug. 4, 2014, available Online at: http://www.hallmark.com/online/webcam-greetings.aspx, retrieved Apr. 19, 2015, 1 page.

Jackson, C., Augmented Reality Trends, DIY Augmented Reality Cards, Jan. 31, 2014, available at http://www.augmentedrealitytrends.com/augmented-reality/augmented-reality-cards.html, retrieved Apr. 20, 2015, 4 pages.

Jackson, C., Augmented Reality Trends, "Smilez AR App Lets You Send Video-Message on a Post Card," Aug. 5, 2014, available Online at http://www.augmentedrealitytrends.com/ar-app/smilez-ar-app.html, retrieved Apr. 20, 2015, 4 pages.

Littleboy, J., Kickstarter, GISMO: Augmented Reality Greeting Cards, Dec. 9, 2013, available Online at https://www.kickstarter.com/projects/artiphany/gizmo-augmented-reality-greeting-cards, retrieved Apr. 20, 2015, 10 pages.

Reactive Paper—Augmented Reality Stationery on Vimeo, believed to be available Apr. 20, 2013, available Online at https://vimeo.com/56928226, retrieved Apr. 20, 2015, 2 pages.

TechCrunch, "Dekko Debuts an augmented Racing Game Playable From the iPad," Apr. 4, 2015, available Online at http://techcrunch.com/2013/06/09/dekko-2/, retrieved Apr. 20, 2015, 5 pages.

Williams, M., "Quickly extract frames from any video with Free Video to JPEG Converter," Aug. 27, 2013, available Online at http://betanews.com/2013/07/18/quickly-extract-frames-from-any-video-with-free-video-to-jpeg-converter/, retrieved Apr. 19, 2015, 2 pages.

* cited by examiner

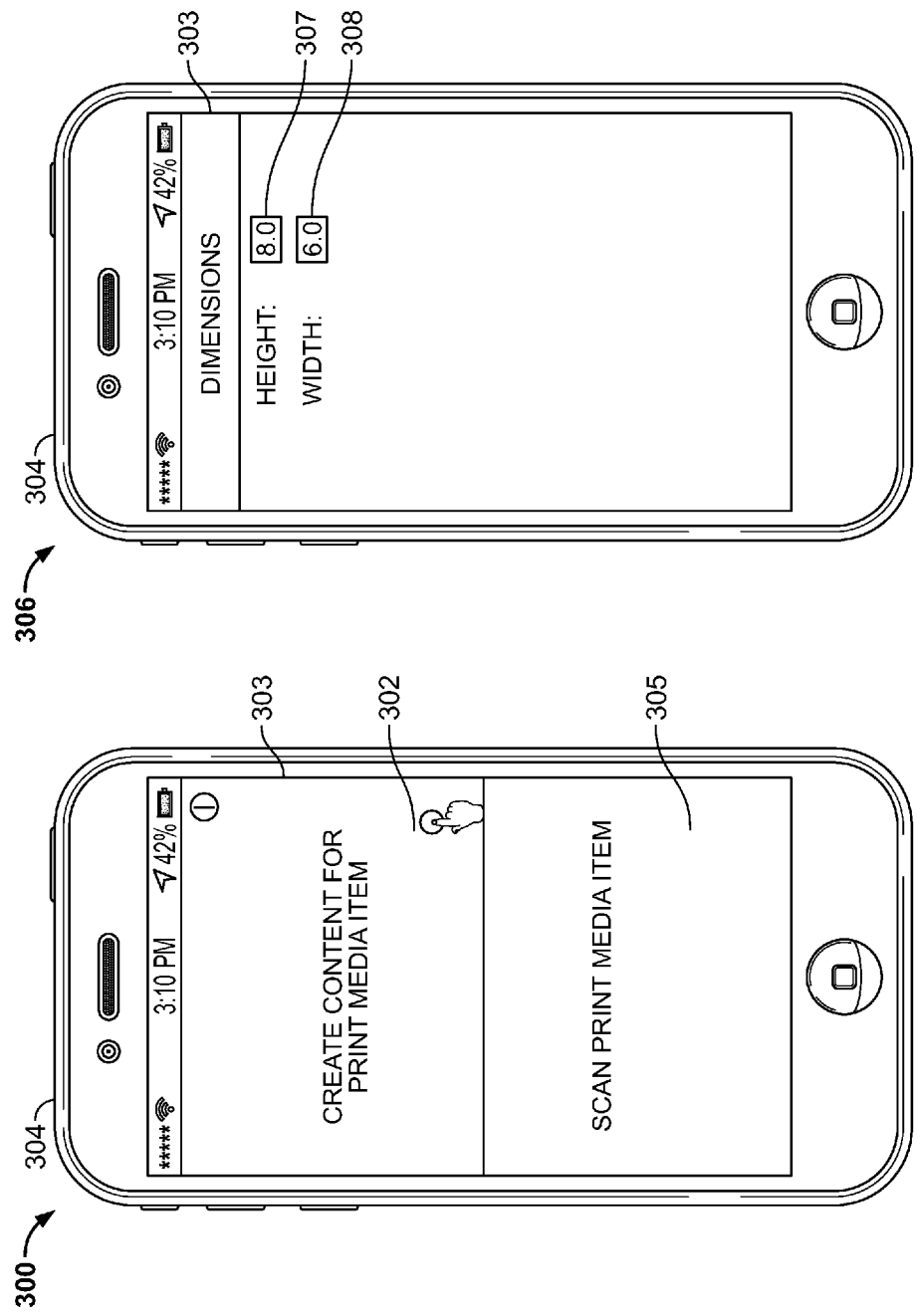

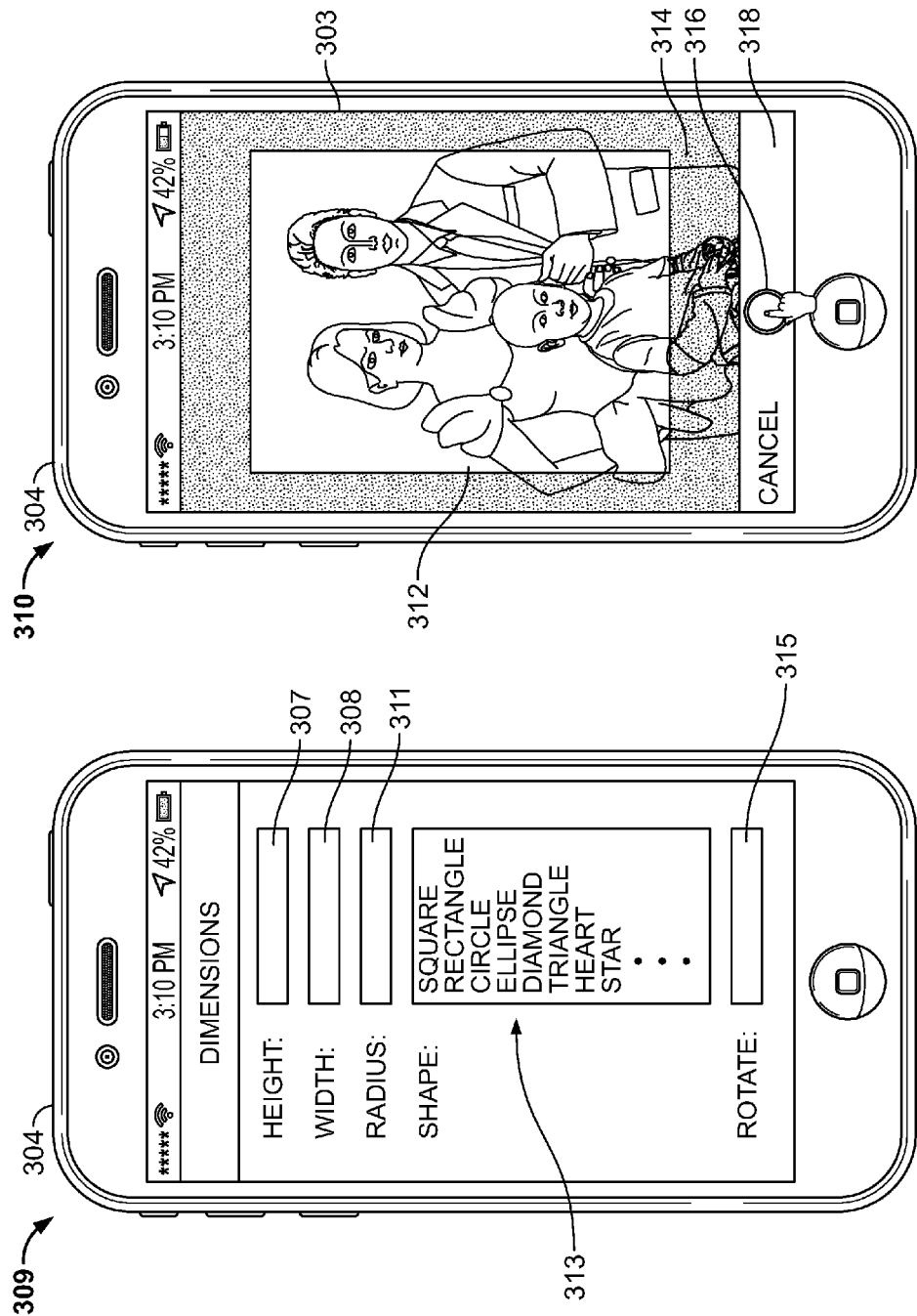

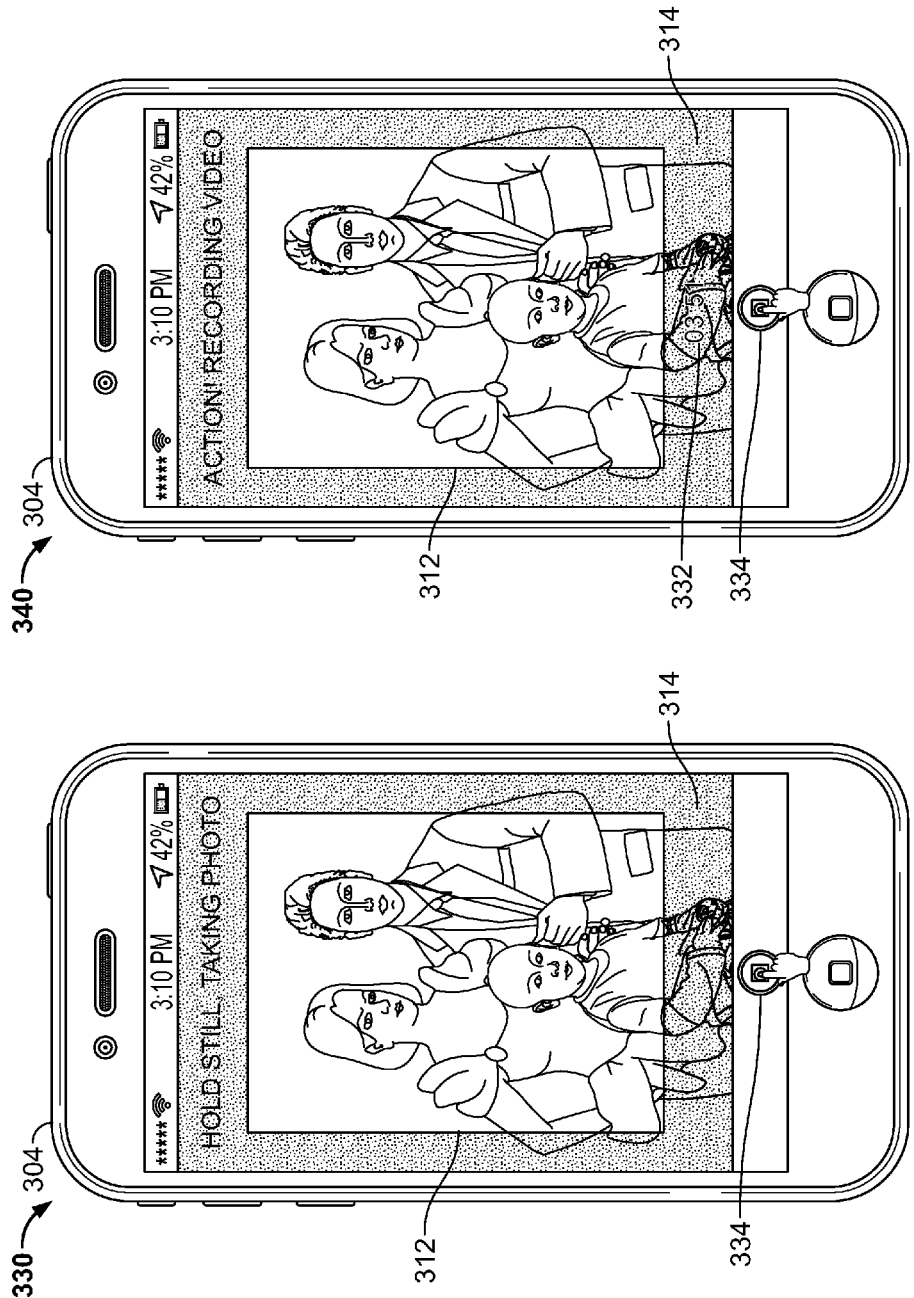

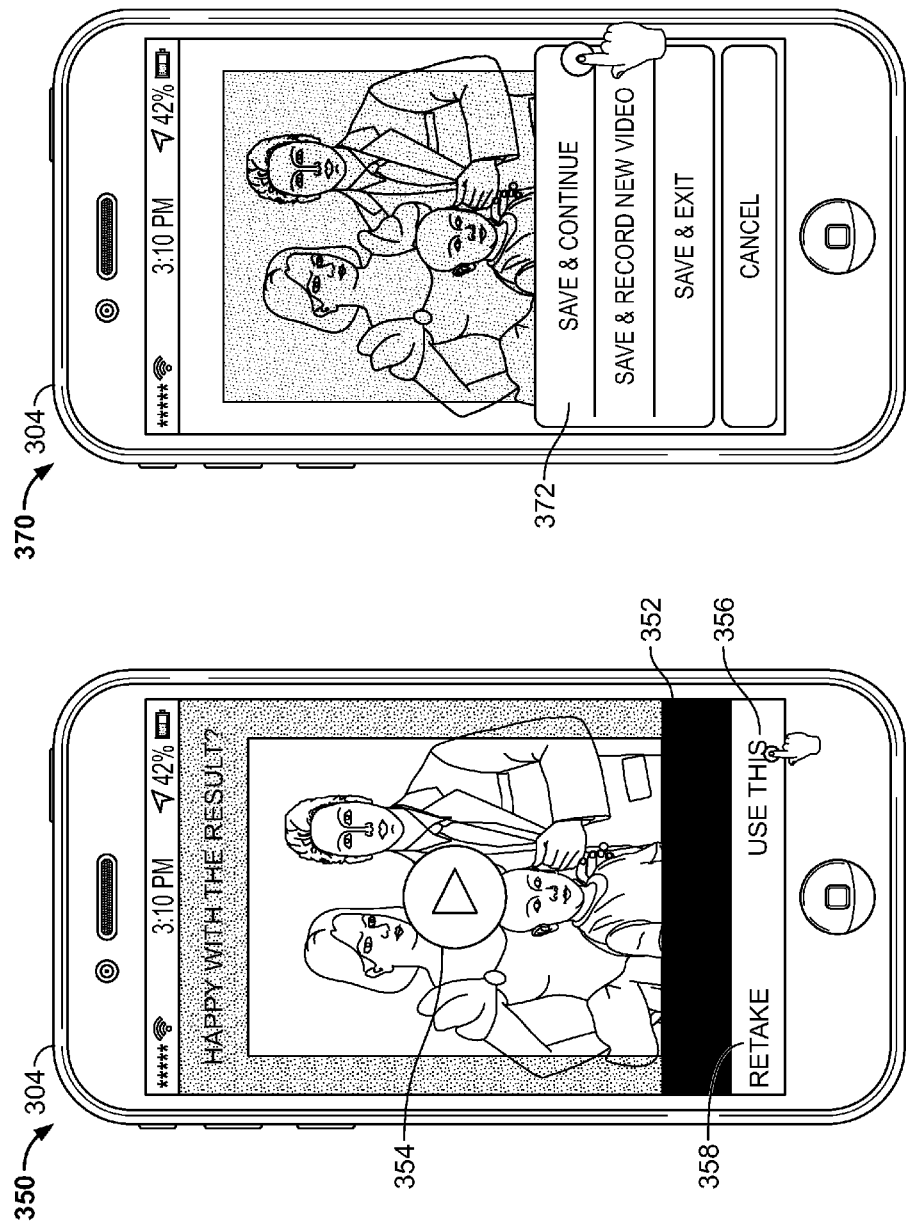

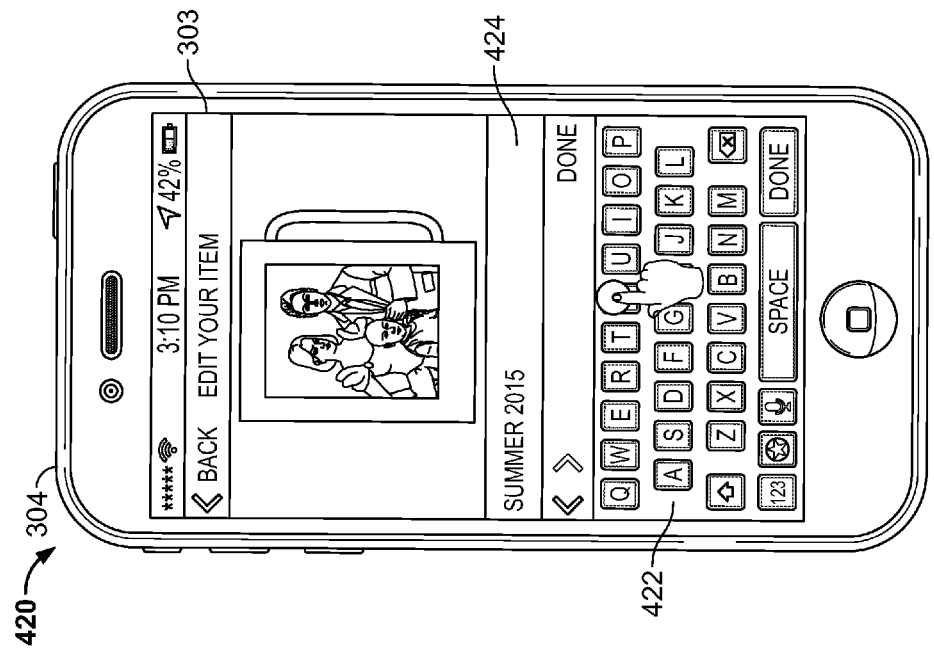
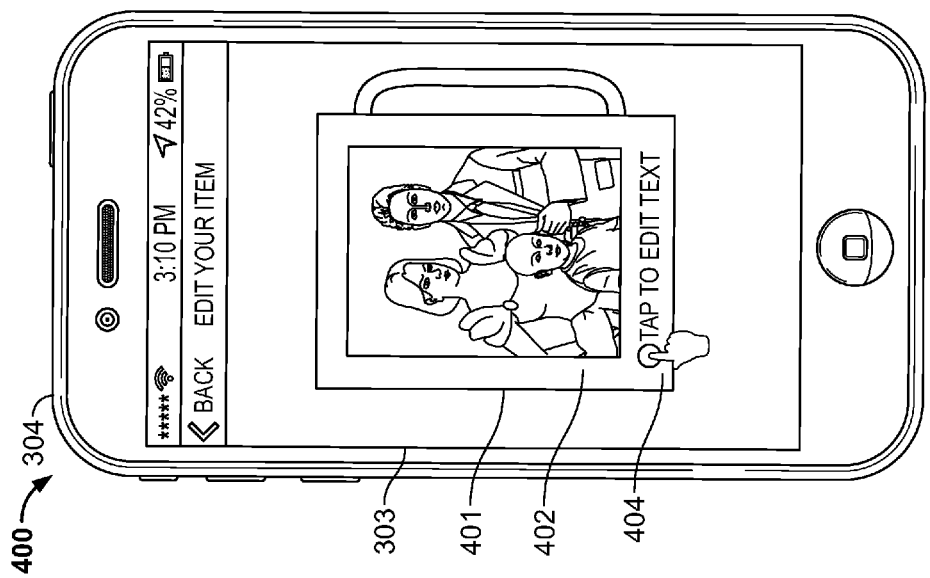
FIG. 9
FIG. 8

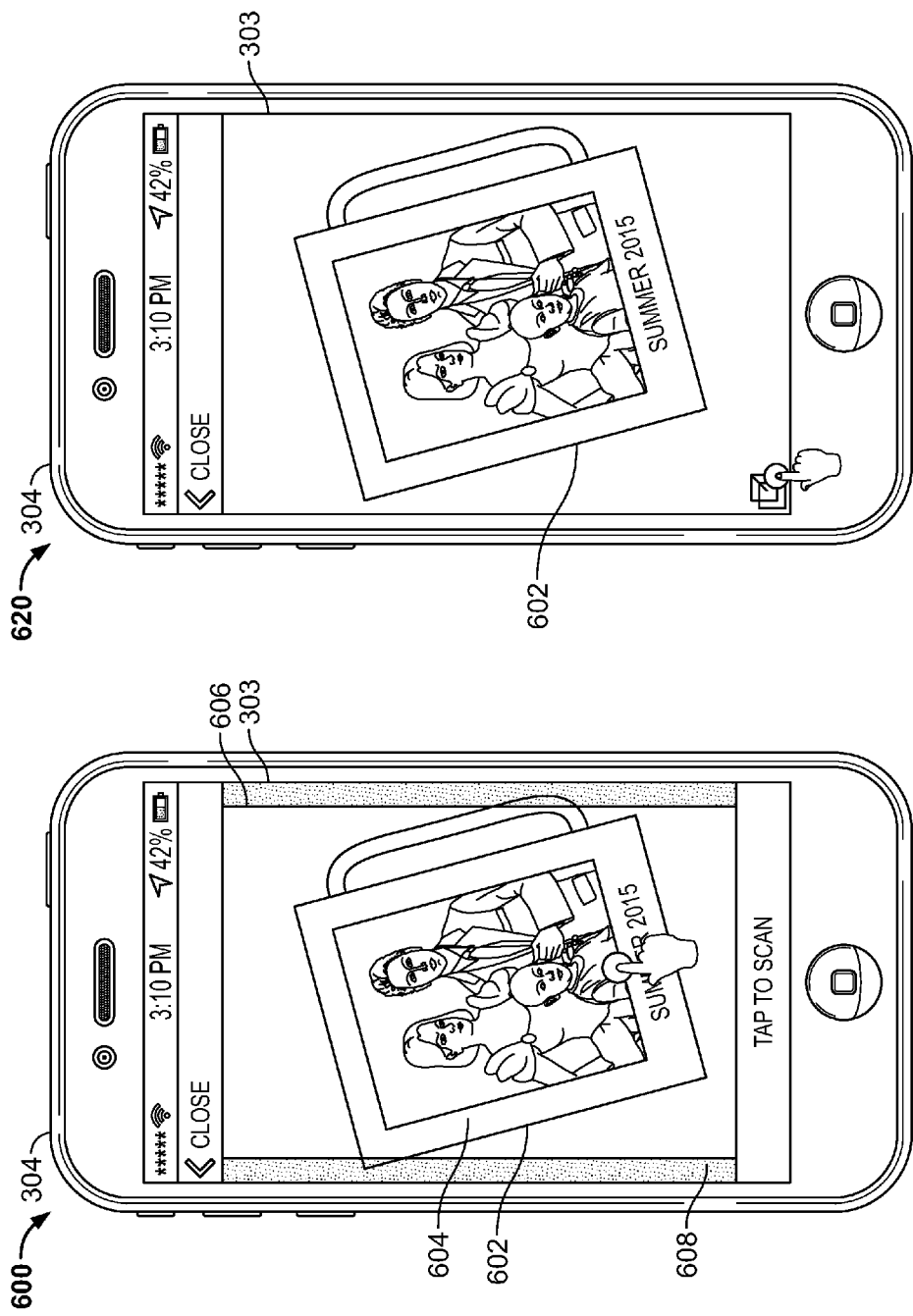

AUGMENTED REALITY CONTENT FOR PRINT MEDIA

CROSS-REFERENCE TO RELATED APPLICATIONS

This application is a continuation-in-part of U.S. patent application Ser. No. 14/691,069, which is entitled "AUGMENTED REALITY GREETING CARDS" and was filed Apr. 20, 2015, now issued as U.S. Pat. No. 9,171,404, the entire contents of which are hereby incorporated by reference.

TECHNICAL FIELD

This document generally describes computer-based technology for acquiring electronic content, including augmented reality content, for print media items, and for presenting the augmented reality content.

BACKGROUND

Traditional print media publications such as magazines, newspapers, journals, and other types of print media publications have included content such as articles and advertisements. The articles and/or advertisements typically include text and one or more photographs or images. Often, a magazine or newspaper editor has size or space constraints for a given article or advertisement for the magazine or newspaper. For a given article, for example, it may be known in advance that a photograph of particular dimensions will be included in the article.

More recently, magazines companies, newspaper companies, and journal companies have begun to publish online versions of the traditional print media publications. Often, the online version of an article or advertisement looks generally the same or similar to the article or advertisement in the physical publication. In some cases, the online publication includes additional content as compared to the print media publication. For example, the online publication may include one or more videos.

Mobile computing devices such as smartphones and tablet computing devices have been used to capture photographs or videos using a camera included with the mobile computing device. For example, a user may take a photograph or record a video using the camera of their smartphone. Upon selection of the camera, for example, the smartphone displays on a display screen of the device one or more camera control features and a camera viewer that provides a view of a subject to be photographed or recorded. The camera viewer and camera control features together typically occupy all or substantially all of the display screen, which typically has an aspect ratio of approximately 16:9 for modern smartphones.

SUMMARY

In a first general aspect, a computer-implemented method of acquiring electronic content to be used with print media includes receiving, at a mobile computing device that includes a camera, an input that specifies one or more dimensions for a photograph to be included with a print media item. The method also includes determining an aspect ratio based on the received input and presenting, on a display screen of the mobile computing device, a camera viewer with an aspect ratio that matches the determined aspect ratio. The method further includes capturing, via the camera of the mobile computing device, a photograph at a first resolution, where an aspect ratio of the captured photograph matches the determined aspect ratio. The method further includes uniquely associating the recorded video with the captured photograph, and transmitting, for receipt by a remote computer system, the captured photograph at the first resolution, the recorded video at the second resolution, and an indication of the unique association between the recorded video and the captured photograph, via a transmitter of the mobile computing device.

Various implementations may include one or more of the following. The method may also include presenting a preview of the captured photograph on the display screen of the mobile computing device. The one or more dimensions may include a height and a width for the photograph to be included with the print media item. The video may include a plurality of individual frames of the video, and wherein the captured photograph is different from each frame of the plurality of individual frames of the video. The captured photograph may be captured before the video is recorded. The recorded video may be uniquely associated with the captured photograph based on a naming convention. The camera viewer may have a rectangular shape. The method may also include receiving a second input that specifies a shape for the photograph to be included in the print media item. The shape may be selected from the group consisting of a square, rectangle, ellipse, circle, triangle, quadrilateral, heart, star, and diamond. The print media item may be selected from the group consisting of a magazine, newspaper, journal, book, brochure, article of clothing, coffee mug, calendar, greeting card, postcard, poster, and business card. The method may also include presenting, on the display screen of the mobile computing device, a shaded view at a display intensity that is less than a display intensity of the camera viewer. The camera viewer may occupy an area of the display screen that is less than an entire area of the display screen. The aspect ratio of the camera viewer may be different from an aspect ratio of the display screen. The method may also include receiving a third input that specifies an edit to the recorded video, and editing the recorded video based on the third input.

In a second general aspect, a computer-implemented method of acquiring electronic content to be used with a print media includes receiving, at a mobile computing device that includes a camera, i) a first input that specifies a height for a photograph to be included with a print media item, and ii) a second input that specifies a width for the photograph to be included with the print media item. The method also includes determining an aspect ratio based on the received first and second inputs and presenting, on a display screen of the mobile computing device, a camera viewer with an aspect ratio that matches the determined aspect ratio. The method further includes capturing, via the camera of the mobile computing device, a photograph at a first resolution, wherein an aspect ratio of the captured photograph matches the determined aspect ratio. The method further includes recording, via the camera of the mobile computing device, a video at a second resolution that is lower than the first resolution, wherein an aspect ratio of the recorded video matches the determined aspect ratio. The method further includes uniquely associating the recorded video with the captured photograph, and transmitting, for receipt by a remote computer system, the captured photograph at the first resolution, the recorded video at the second resolution, and an indication of the unique association between the recorded video and the captured photograph, via a transmitter of the mobile computing device.

Various implementations may include one or more of the following. The camera viewer may have a rectangular shape. The method may also include receiving a second input that specifies a shape for the photograph to be included with the print media item. The shape may be selected from the group consisting of a square, rectangle, ellipse, circle, triangle, quadrilateral, heart, star, and diamond. The video may include a plurality of individual frames of the video, and the captured photograph may be different from each frame of the plurality of individual frames of the video. The captured photograph may be captured before the video is recorded.

Other features, objects, and advantages of the technology described in this document will be apparent from the description and the drawings, and from the claims.

BRIEF DESCRIPTION OF THE DRAWINGS

FIG. 3A depicts an example mobile computing device displaying a screen shot of an example user interface through which a user may select to create content for an augmented reality print media item or scan an augmented reality print media item.

FIG. 3B depicts an example mobile computing device displaying a screen shot of an example user interface through which a user may provide one or more dimensions.

FIG. 3C depicts an example mobile computing device displaying a screen shot of an example user interface through which a user may provide one or more dimensions, shapes, or other augmented reality print media parameters.

FIG. 4 depicts an example mobile computing device displaying a screen shot of an example user interface 310 through which a user may initiate capture of a photograph and recording of a video for an augmented reality print media item.

FIGS. 5A and 5B depict an example mobile computing device displaying screen shots of example user interfaces through which a user may monitor capturing of a photograph and recording of a video, respectively, for an augmented reality print media item.

FIG. 6 depicts an example mobile computing device displaying a screen shot of an example user interface through which a user may preview a recorded video for an augmented reality print media item.

FIG. 7 depicts an example mobile computing device displaying a screen shot of an example user interface through which a user may select to save the captured photograph and recorded video.

FIG. 8 depicts an example mobile computing device displaying a screen shot of an example user interface through which a user may view and edit a print media item that includes a photograph.

FIG. 9 depicts an example mobile computing device displaying a screen shot of an example user interface through which a user may make a change to a print media item.

FIG. 11 depicts an example mobile computing device displaying a screen shot of an example user interface, through which a user may initiate scanning of a print media item or a portion (e.g., a photograph) of the print media item.

FIG. 12 depicts an example mobile computing device displaying a screen shot of an example user interface that can be used to present an augmented reality experience.

Like reference symbols in the various drawings indicate like elements.

DETAILED DESCRIPTION

Figure 1A:
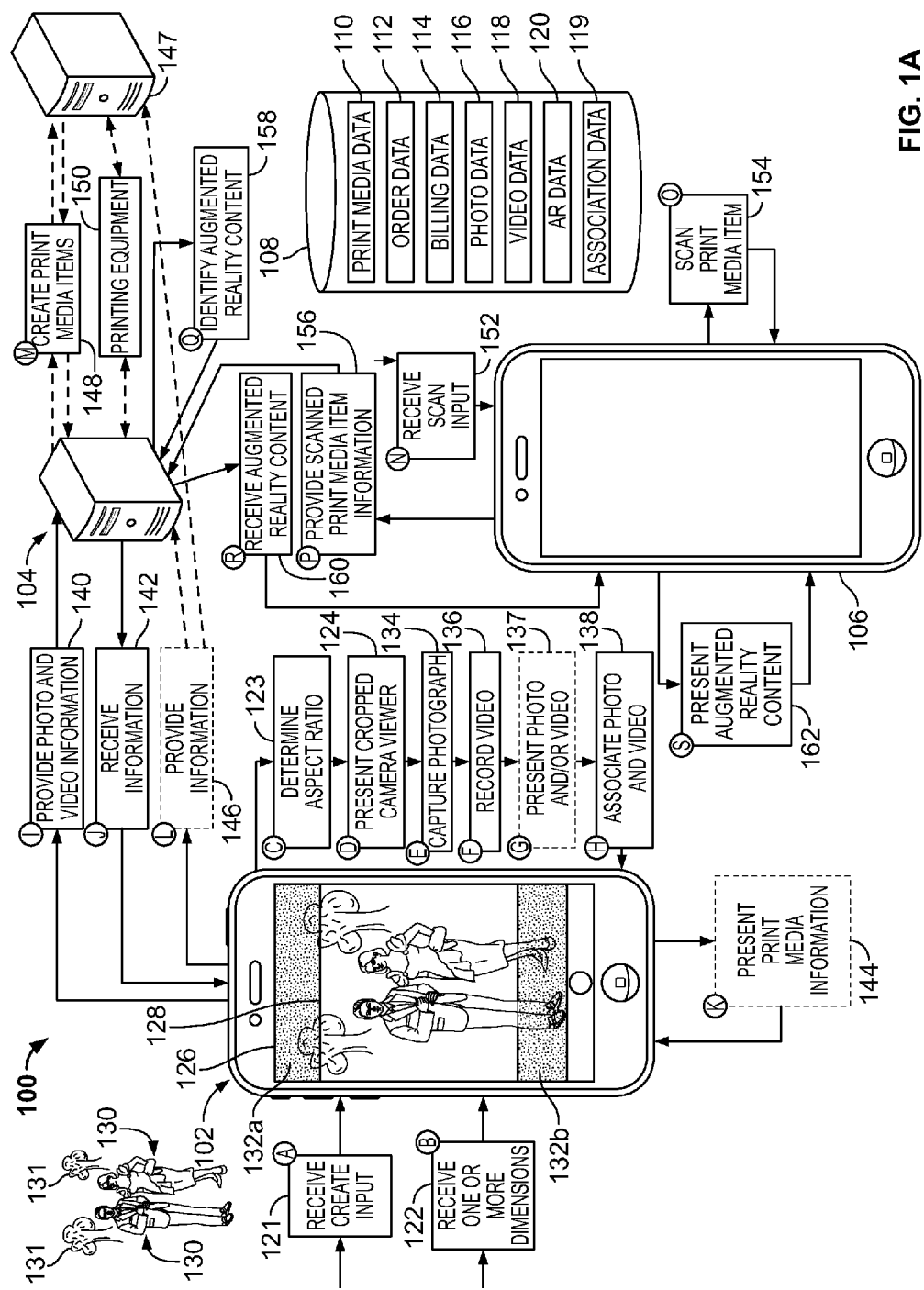
FIG. 1A is a conceptual diagram of an example system that can be used to acquire electronic content, including augmented reality content, for print media items, and for presenting the augmented reality content.

Described herein are systems, devices, and techniques for acquiring electronic content, including augmented reality content, for print media items, and for presenting the augmented reality content. Without limitation, the electronic content can be acquired for print media items such as magazines, newspapers, journals, greeting cards, postcards, business cards, books, brochures, calendars, articles of clothing, coffee mugs, or any other appropriate item on which a photograph may be printed, for example. The augmented reality content can include, or can be associated with, an augmented reality feature. For example, the systems, devices, and techniques described herein may be used to create content for a print media item (or in some examples for a digital media item) that includes one or more photographs or images that may be augmented or supplemented by computer-generated sensory input such as audio, video, graphics, animations, or a combination of the foregoing. Also described herein are systems, devices, and techniques for identifying, based on a photograph included with the print media item, augmented reality content, and for presenting an augmented reality experience that includes the identified augmented reality content.

Some examples of the systems, devices, and techniques described herein can facilitate creation of an augmented reality print media item by capturing a photograph to be included with (e.g., in or on) the print media item, and by recording a video to be associated with the photograph and presented to a user. Presentation of the video may supplement the photograph, and provide the user with an enhanced user experience, according to some implementations.

In some examples, the systems, devices and techniques described herein can be used to present, on a display screen of a mobile computing device and in place of a traditional camera viewer for the mobile computing device, a cropped camera viewer that is configured based on a user-provided input that specifies one or more photograph dimensions. The one or more photograph dimensions may correspond to one or more dimensions of a photograph to be included with a print media item, such as a photograph to be included in a magazine article, a newspaper article, a journal article, an advertisement, a brochure, book, calendar, greeting card, postcard, poster, business card, or on a coffee mug, t-shirt, other type of clothing, or others. A user may know, for example based on the particular print media item for which the photograph is to be included, the dimensions for the photograph based on one or more predetermined rules, constraints, settings, limitations, preferences, or the like associated with the particular print media item.

In some examples, the cropped camera viewer may include an aspect ratio that matches an aspect ratio of the photograph to be included with the print media item. In some examples, the cropped camera view may include a shape that matches a shape of the photograph to be included with the print media item. Because the cropped camera view may include a matching aspect ratio (or a matching shape in some examples) as an aspect ratio (or shape) of a photograph to be included with the print media item, a user of the mobile computing device may be better able to understand and appreciate how a photograph or video captured or recorded by the mobile computing device may appear with (e.g., in or on) the print media item or may be presented with the augmented reality experience, according to some implementations. In some examples, the cropped camera view may include a size, aspect ratio, or one or more dimensions that match a size, aspect ratio, or one or more dimensions of a photograph placeholder of the print media item, which may be provided or selected by a user of the mobile computing device, for example.

In some examples, upon receipt of an input, such as a "create," or "create content" input, the cropped view of the camera may be presented on the display screen of the device. Upon receipt of an input, such as a "start" input, the camera may capture a high-resolution photograph of a subject, and may then record a video of the subject, where the photograph and video are each cropped to match an aspect ratio determined based on the user-provided input that specifies one or more dimensions of a photograph to be included with the print media item. The resolution of the captured photograph may be higher than the resolution of the recorded video, for example, and may be a high-resolution or high-definition photograph. A print media item that includes the captured high-resolution photograph may be created, where an aspect ratio or shape (or both) of the photograph included with the print media item matches the aspect ratio or shape (or both) of the cropped camera viewer, for example.

The augmented reality content can include audio, video, graphics, animations, or a combination of the foregoing (e.g., audio and video), and a mobile computing device can present the content as an augmented reality experience. In some examples, the presented augmented reality experience can additionally include presentation of a view of a static image, such as a view of the photograph, or a view of the print media item and the photograph. In some examples, following an initial presentation of the photograph, the view of the print media item, or both, the augmented reality presentation can include presentation of a video that appears to "pop" or spring from the photograph on the print media item. In some examples, the video can include audio.

FIG. 1A is a conceptual diagram of an example system 100 that can be used to acquire electronic content, including augmented reality content, for print media items, and for presenting the augmented reality content. The system 100 includes an example first mobile computing device 102, such as a smartphone, tablet computing device or other appropriate mobile computing device, which can be used to acquire electronic content to be used with a print media item, and in some examples can facilitate creation of an augmented reality print media item. For example, the first mobile computing device 102 can use a camera of the first mobile computing device to acquire the electronic content (e.g., one or more photographs and videos), including content for an augmented reality experience, for a print media item. The device 102 may be used to capture a photograph of a subject at a first resolution, and to record a video of the subject at a second resolution. In some examples, the first resolution is higher than the second resolution, and the photograph is a high-resolution photograph or high-definition photograph. In some examples, the photograph is captured separately from the video. In some examples, the camera takes the photograph before the camera begins to record the video. In some example, the photograph is captured independently of the recording of the video, and the photograph does not correspond to any individual frame of the video.

In some examples, a cropped view of the camera can be presented on a display screen of the first mobile computing device 102 to provide a user of the first mobile computing device 102 with an accurate representation of one or more of the aspect ratio, shape, size, area, scope, coverage, or one or more dimensions of a photograph or video to be associated with the print media item. The cropped view of the camera may include an aspect ratio that corresponds to (for example, matches) an aspect ratio of a photograph to be used with, in, or on the print media item, where a predetermined layout or plan for the print media item or a portion of the print media item (e.g., an article of a magazine, a page of a calendar, a flap of a brochure, a front side of a business card, a t-shirt of a particular size, and the like) includes a placeholder with predetermined dimensions for the photograph. In some examples, the cropped view may occupy a portion or subset of the display screen of the mobile computing device 102 that is less than the entire display screen of the mobile computing device 102, and may not occupy the entire display screen of the mobile computing device 102.

The example system 100 also includes an example computer system 104 that serves, receives, and manages print media information, photograph information, augmented reality experience information, and in some examples order, billing, and delivery information for the system 100, according to some implementations. The computer system 104 can include one or more computing devices, such as a computer server system with one or more computer servers, a shared server system, a dedicated server system, a cloud computing system, a desktop computer, a laptop computer, or any combination thereof. The example system 100 further includes a second example mobile computing device 106, such as a smartphone, tablet computing device or other appropriate mobile computing device, which can be used to present an augmented reality experience, for example.

The computer system 104 can be used by users via client computing devices, such as the first and second mobile computing devices 102, 106 in some examples. Mobile computing device 102 or mobile computing device 106 may receive information transmitted by the computer system 104, and similarly either of the mobile computing devices 102, 106 may transmit information for receipt by the computer system 104. For example, the computer system 104 can provide to a mobile computing device, or receive from a mobile computing device, print media feature or parameter information, order information, delivery information, billing or payment information, augmented reality information, information relating to a photograph to be included with (e.g., in or on) a print media item, information relating to a video to be used for an augmented reality presentation, information associating a photograph with a video, or other appropriate information that can be used to create an augmented reality print media item, or to present an augmented reality experience.

The second example mobile computing device 106 can be used to scan a photograph, such as a photograph associated with a print media item and present an augmented reality experience, according to some implementations. For example, a user may use the second mobile computing device 106 to scan a photograph in the print media item or on the print media item, transmit information relating to the scanned photograph to the computer system 104, receive augmented reality information (e.g., a video associated with the photograph and information relating to presenting the video) from the computer system 104, and may present an augmented reality experience on a display screen of the second mobile computing device 106. In some examples, the second mobile computing device 106 can present, on its display screen, a view of the print media item that includes the photograph, and then can present the video that is associated with the photograph such that the video appears to "pop" from the photograph. For example, the video may be presented in a relation to the photograph associated with the print media item, whereby the subject or subjects of the video may initially be positionally aligned with the subject or subjects of the photograph such that when the video begins to play, the presentation provides the impression to a viewer that the subject or subjects of the photograph of the print media item spring to life.

The computer system 104 can access an electronic storage repository 108, which may be used to store print media data 110, order data 112, billing data 114, photo or image data 116, video data 118, augmented reality experience data 120, and association data 119. Print media data 110 can include information related to a magazine, newspaper, journal, book, brochure, article of clothing, coffee mug, calendar, greeting card, postcard, poster, business card, or other print media item, such as one or more dimensions or size information (or shape information) related to a photograph (or a placeholder for a photograph), an article, an advertisement, or the like, for the print media item. Order data 112 can include quantity information, pricing information, promotional code or coupon information, delivery information, address information, and the like. Billing data 114 can include merchant information, credit card information, electronic payment information, bank information, payment processor information, customer information, and the like. Photo data 116 can include electronic representations of photographs, such as photographs received by the computer system 104 from the first mobile computing device 102. Video data 118 can include video files that can be used in augmented reality presentations, such as video files received by the computer system 104 from the first mobile computing device 102. Augmented reality experience data 120 can include information that a computing device, such as the second mobile computing device 106, can use to present the augmented reality content for the augmented reality experience. Information such as how and where to position the video on the display screen of the second mobile computing device 106, or how and where to position the video in the view with respect to a position of the print media item or a portion (e.g., the photograph) of the print media item can be included in the augmented reality experience data 120. Association data 119 can include information that associates or provides a one-to-one correspondence between a particular photograph (e.g., a particular photograph stored in photo data 116) and a particular video (e.g., a particular video stored in video data 118). In some examples, some or all of the repository 108 is included in computer system 104, and in some examples the repository 108 is external from computer system 104.

Example steps A-L, which are depicted as being performed across the first mobile computing device 102 and the computer system 104 (or another computer system 147), are an example of steps that can be used to facilitate acquisition of electronic content, including augmented reality content, to be used with print media or with a print media item. As described above, mobile computing device 102 may be a smartphone or a tablet computing device, but more generally can be any of a variety of appropriate computing devices that include a camera capable of capturing or taking a photograph and capturing or recording a video. Examples of alternative devices can include a personal digital assistant, a laptop computer, a desktop computer, a wearable computing device (e.g., a smartwatch or a smart-bracelet), or other appropriate computing devices. The mobile computing device 102 can communicate with the computer system 104 over one or more appropriate communication networks, such as the Internet, or one or more local area networks (LANs), wide area networks (WANs), cellular networks, virtual private networks (VPNs), wireless networks (e.g., Wi-Fi networks, mobile data networks (e.g., 3G/4G networks)), wired networks (e.g., fiber optic networks), other appropriate network, or any appropriate combination thereof.

As indicated by step A (121), the first mobile computing device 102 can receive a create, or create content, input. The create input may be provided by a user of the first mobile computing device 102, as by selection of a user interface feature (e.g., selection of a button or icon, selection of a voice-activated feature), for example, and may indicate that the user desires to create or acquire content for use with a print media item.

As indicated at step B (122), the first mobile computing device 102 can receive an input that provides or specifies one or more dimensions for a photograph to be included with a print media item. In some examples, the one or more dimensions may correspond to the dimensions of a photograph placeholder for the print media item. In some examples, the input may be received, for example in an input field, as by a user of the first mobile computing device 102 typing the one or more dimensions into a user interface of the mobile computing device 102, speaking the one or more dimensions for recognition by a voice recognition feature of the first mobile computing device 102, selecting the one or more dimensions from a list of predetermined one or more dimensions via a user interface of the first mobile computing device 102, or in other appropriate manners. The one or more dimensions can include, in various examples, a height, a width, a column inches dimension, a radius (or multiple radii, such as a first radius and a second radius for an ellipse shape), or other appropriate dimension(s). In some examples, a user may select from a list of predetermined dimensions, and in some examples the user may enter the one or more dimensions other than by selecting from a list of predetermined dimensions (e.g., by typing or otherwise providing the one or more dimensions in an input field of a user interface). Units for the one or more dimensions may be inches, millimeters, centimeters, or any other appropriate unit, for example (e.g., feet or meters may be appropriate for large print media items), or custom dimension units (e.g., a proprietary dimension unit).

In some examples, an input describing a shape of the photograph to be included with the print media item may also be received at step B (122). Examples of such shapes can include a square, rectangle, ellipse, circle, triangle, quadrilateral, heart, star, and diamond, to list just a few examples. Other shapes can also be used. In some examples, a user may select from a list of predetermined shapes. In some examples, the input describing the shape of the photograph to be included with the print media item can be received at step B (122) in lieu of the input that provides or specifies one or more dimensions for a photograph to be included with a print media item. In some examples, an input describing a shape and an input providing one or more dimensions may be received at step B (122). In some examples, only an input that provides the one or more dimensions may be received at step B (122), without receiving an input that describes a shape, for example. In such examples, a default shape for the photograph may be used (e.g., a rectangle).

As indicated at step C (123), the first mobile computing device 102 may determine an aspect ratio based on the received input that provided or specified the one or more dimensions for the photograph to be included with the print media item. For example, based on the received one or more dimensions, the first mobile computing device 102 may determine a relationship between a width and a height. In some examples, the first mobile computing device 102 may determine a proportional relationship between the width and the height. The determined aspect ratio may correspond to an aspect ratio for the photograph to be included with the print media item. The determined aspect ratio may also be used in presenting a cropped camera viewer, in capturing a photograph, and in recording a video, as will be further described below.

In some examples, the first mobile computing device 102 may determine the aspect ratio based solely on the one or more dimensions received at step B (122). In some examples, the first mobile computing device 102 may determine the aspect ratio based on the one or more dimensions received at step B (122) and additionally based on properties of a shape, where in some examples an input that specifies a shape is also received at step B (122). In some examples, the first mobile computing device 102 may determine the aspect ratio based on the one or more dimensions received at step B (122) and on additional information, such as information previously stored at the first mobile computing device 102 or received from the computer system 104. In some examples, the first mobile computing device 102 may use a predefined formula to calculate or determine the aspect ratio, where in some examples the predefined formula is selected from a set of formulas based on a received shape input.

As indicated at step D (124), the first mobile computing device 102 can present, on a display screen 126 of the mobile computing device 102, a cropped camera viewer 128. The cropped camera viewer 128 includes an aspect ratio that matches the aspect ratio determined at step C (123) above. As such, the aspect ratio of the cropped camera viewer 128 is representative of (e.g., matches) the aspect ratio of the photograph to be included with the print media item, for example based on the one or more dimensions received at step B (122). More generally, in various examples, the cropped camera viewer 128 (and any other cropped camera viewers discussed herein) may include one or more of an aspect ratio, shape, size, area, scope, coverage, or one or more dimensions that correspond to or match a corresponding parameter of a photograph to be included with a print media item, or a placeholder, such as a photograph placeholder, of a print media template. The camera feature of the first mobile computing device 102 may launch or open, according to some implementations, but the traditional camera viewer that occupies all or substantially all of the display screen 126 of the device 102 may be replaced by the cropped camera viewer 128.

The mobile computing device 102 includes one or more camera lenses, including a lens on the side of the device opposite the display screen 126, and the cropped camera viewer 128 provides a view of images captured by one or more of the lenses (e.g., the lens on the side of the device opposite the display screen 126).

As can be seen in FIG. 1A, the cropped camera viewer 128 occupies an area or portion of the display screen that is less than the entire display screen 126. As will be described further below, a portion of the display screen may be blacked-out, greyed-out or shaded, for example, and a portion of the display screen may be used to display one or more camera control features. In some examples, the cropped camera viewer 128 occupies less than about 90% of the entire display screen; in some examples, the cropped camera viewer 128 occupies less than about 80% of the entire display screen; in some examples, the cropped camera viewer 128 occupies less than about three-quarters (e.g., less than about 75%) of the entire display screen; in some examples, the cropped camera viewer 128 occupies less than about 70% of the entire display screen; in some examples, the cropped camera viewer 128 occupies less than about 60% of the entire display screen; in some examples, the cropped camera viewer 128 occupies less than about half (e.g., less than about 50%) of the area of the entire display screen 126. In some examples, the cropped camera viewer 128 occupies an area that is about half of the area of the entire display screen 126.

In various examples, the cropped camera viewer 128 may be configured to include one or more of an aspect ratio, shape, size, area, scope, coverage, or one or more dimensions that correspond to or match a corresponding parameter of a photograph to be included with a print media item. In general, the aspect ratio may be any appropriate aspect ratio, and may be determined, at least in part, based on the one or more dimensions received at step B (122), described above.

A user of the first mobile computing device 102 may wish to acquire content, including a photograph of one or more subjects 130, for a print media item, such as any of the print media items discussed above. In the example of FIG. 1A, two people are shown as subjects 130, and they are standing in front of two trees 131. The user may orient the first mobile computing device 102 so that the subjects 130 appear in the cropped camera viewer 128. As can be seen in FIG. 1A, the display screen 126 may depict one or more shaded or greyed-out portions 132 of the display in relation to the cropped camera viewer 128. A first shaded or greyed-out portion 132*a* is shown above the cropped camera viewer 128, and a second shaded or greyed-out portion 132*b* is shown below the cropped camera viewer 128. In the example of FIG. 1A, the cropped camera viewer 128 extends across the entire width of the display screen 126 of the first mobile computing device 102, but does not extend across the entire length (e.g., height) of the display screen 126 of the first mobile computing device 102. For example, the first and second shaded or greyed-out portions 132*a*, 132*b* are displayed on the display screen concurrently with the cropped camera viewer 128. In other examples, the cropped camera viewer 128 may not extend across the entire width of the display screen 126, and the one or more shaded or greyed-out portions 132*a*, 132*b* may be replaced by a shaded or greyed-out portion that surrounds a periphery of the cropped camera viewer 128, for example.

In some examples, portions of the subjects 130 and surrounding environment may be visible, albeit in a greyed-out fashion, in the greyed-out portions 132. For example, as can be seen in FIG. 1A, portions of the trees 131 (e.g., the top portions of the trees 131) are visible at a reduced visibility (e.g., when compared to a visibility within the cropped camera viewer 128) in the shaded or first greyed-out portion 132*a*, and portions of the subjects 130 (e.g., the subjects' feet and lower legs) are visible at a reduced visibility in the second shaded or grey-out portion 132*b*. In some examples the portions of the subjects 130 and surrounding environment may not be visible and the depicted greyed-out portion 132 and may be blacked-out (not shown in FIG. 1A), for example.

Figure 1C:
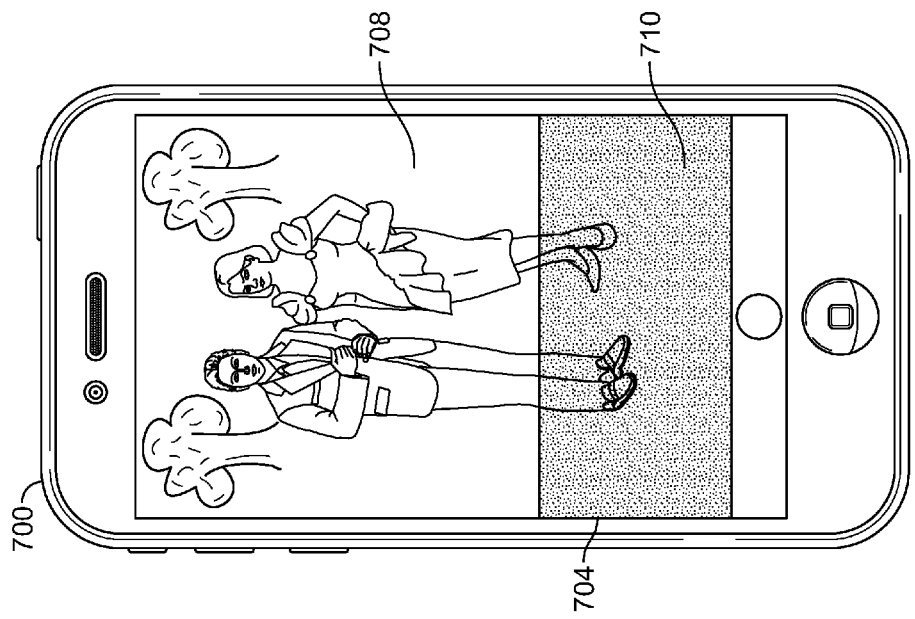
FIGS. 1B, 1C, 1D, 1E, 1F, 1G, 1H, 1I, 1J, and 1K are conceptual diagrams of various example cropped camera viewers, presented on display screens of example mobile computing devices.
Figure 1B:
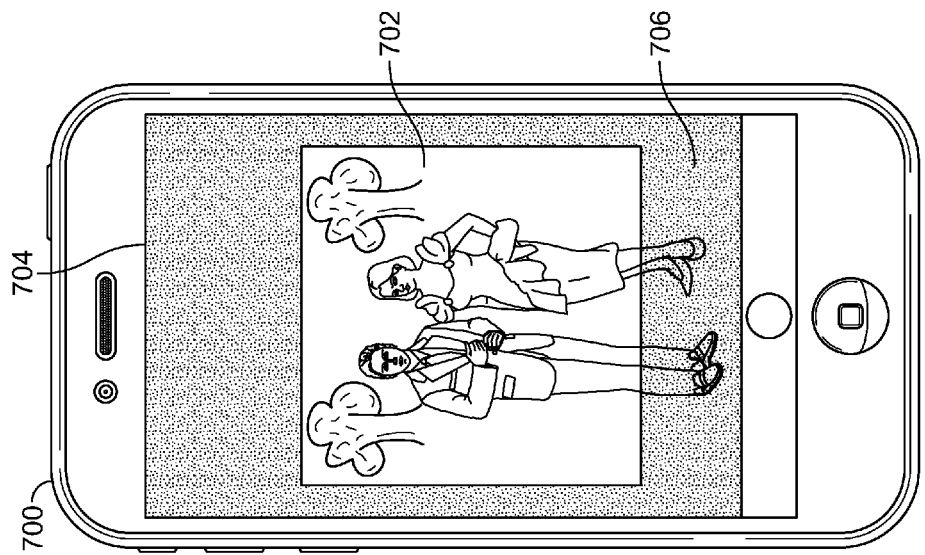

FIGS. 1B, 1C, 1D, 1E, 1F, 1G, 1H, 1I, 1J, and 1K are conceptual diagrams of various example cropped camera viewers, presented on display screens of example mobile computing devices, each configured with an aspect ratio determined based on provided one or more dimensions that correspond to dimensions of a photograph to be included with a print media item. FIG. 1B depicts an example mobile computing device 700 presenting a cropped camera viewer 702 on a display screen 704 of the device 700. The cropped camera viewer 702 may include one or more of an aspect ratio, shape, size, area, scope, coverage, or one or more dimensions that correspond to or match a corresponding parameter of a photograph to be included with a print media item. In this example, the aspect ratio of the cropped camera viewer 702 may be about 1:1. A shaded or grey-out portion 706, in this example, surrounds a periphery of the cropped camera viewer 702 on the display screen 704. In this example, the shaded or greyed-out portion 706 is located above, below, to the left, and to the right of the cropped camera viewer 702. The portion 706 can provide a reduced visibility view, when compared with the view of the cropped camera viewer 702, of the subjects or surrounding environment that are the focus of the to-be-captured photograph or video. In some examples, the portion 706 may be blacked out rather than shaded.

FIG. 1C depicts the mobile computing device 700 presenting a cropped camera viewer 708 on the display screen 704 of the device 700. The cropped camera viewer 708 may include one or more of an aspect ratio, shape, size, area, scope, coverage, or one or more dimensions that correspond to or match a corresponding parameter of a photograph to be included with a print media item. In this example, the cropped camera viewer 708 is presented at or near the top of the display screen 704, and the aspect ratio of the cropped camera viewer 708 may be about 1:1. A shaded or grey-out portion 710, in this example, is shown below the cropped camera viewer 708 on the display screen 704. The portion 710 can provide a reduced visibility view, when compared with the view of the cropped camera viewer 708, of the subjects or surrounding environment that are the focus of the to-be-captured photograph or video. In some examples, the portion 710 may be blacked out.

Figure 1E:
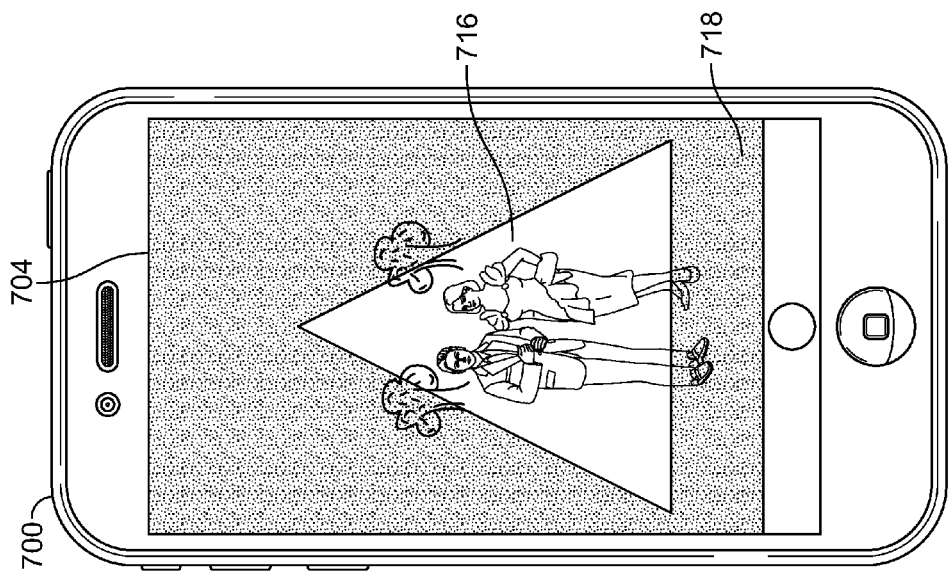
Figure 1D:
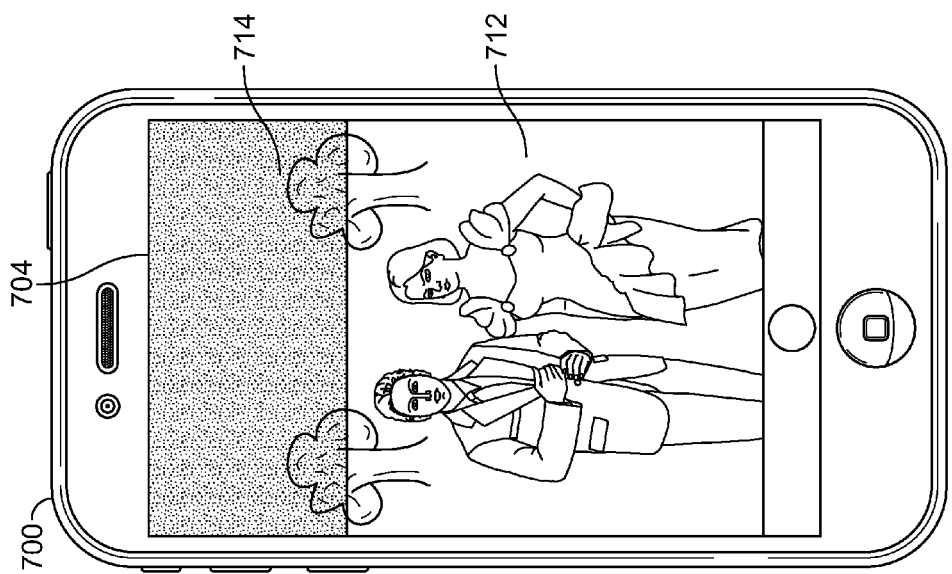

FIG. 1D depicts the mobile computing device 700 presenting a cropped camera viewer 712 on the display screen 704 of the device 700. The cropped camera viewer 712 may include one or more of an aspect ratio, shape, size, area, scope, coverage, or one or more dimensions that correspond to or match a corresponding parameter of a photograph to be included with a print media item. In this example, the cropped camera viewer 712 is presented at or near the bottom of the display screen 704, and the aspect ratio of the cropped camera viewer 712 may be about 1:1. A shaded or grey-out portion 714, in this example, is shown above the cropped camera viewer 712 on the display screen 704. The portion 714 can provide a reduced visibility view, when compared with the view of the cropped camera viewer 712, of the subjects or surrounding environment that are the focus of the to-be-captured photograph or video. In some examples, the portion 714 may be blacked out.

FIG. 1E depicts the mobile computing device 700 presenting a cropped camera viewer 716 on the display screen 704 of the device 700. The cropped camera viewer 716 may include one or more of an aspect ratio, shape, size, area, scope, coverage, or one or more dimensions that correspond to or match a corresponding parameter of a photograph to be included with a print media item. In this example, the cropped camera viewer 716 has a triangle shape. The triangular cropped camera viewer 716 does not occupy the entire width of the display screen 704 in this example, but in some examples a base of the triangle-shaped viewer 716 (or another portion of the triangle viewer) may span the entire width (or length) of the display screen 704. In some examples, the cropped camera viewer 716 may have a different orientation on the screen 704. For example, the viewer may be rotated by a particular amount (e.g., by a particular number of degrees). A shaded or grey-out portion 718, in this example, is shown surrounding the cropped camera viewer 716 on the display screen 704. In examples where a portion of the viewer 716 occupies the entire width of the display screen 704, two or more greyed-out portions may be included (e.g., above and below the viewer 716). The greyed-out portion 718 can provide a reduced visibility view, when compared with the view of the cropped camera viewer 716, of the subjects or surrounding environment that are the focus of the to-be-captured photograph or video. In some examples, the portion 718 may be blacked out.

Figure 1G:
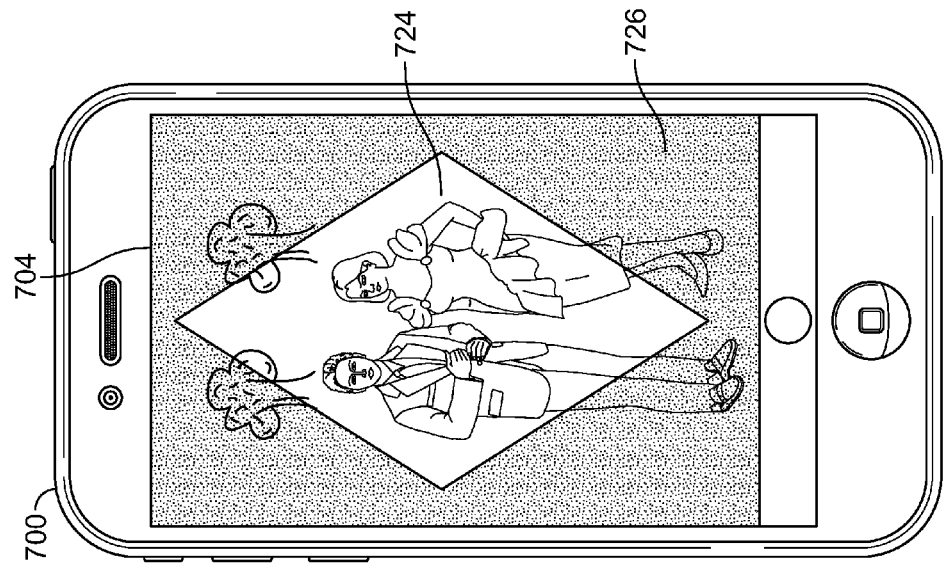
Figure 1F:
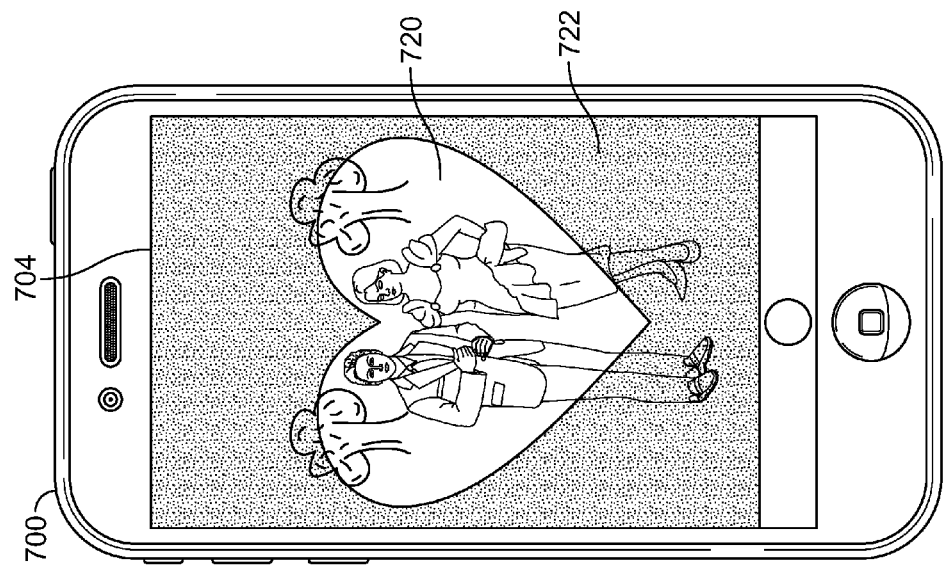

FIG. 1F depicts the mobile computing device 700 presenting a cropped camera viewer 720 on the display screen 704 of the device 700. The cropped camera viewer 720 may include one or more of an aspect ratio, shape, size, area, scope, coverage, or one or more dimensions that correspond to or match a corresponding parameter of a photograph to be included with a print media item. In this example, the cropped camera viewer 720 has a heart shape. The heart-shaped cropped camera viewer 720 does not occupy the entire width of the display screen 704 in this example, but in some examples a portion of the heart-shaped viewer 720 may span the entire width (or length) of the display screen 704. In some examples, the cropped camera viewer 720 may have a different orientation on the screen 704. For example, the viewer 720 may be rotated by a particular amount (e.g., by a particular number of degrees). A shaded or grey-out portion 722, in this example, is shown surrounding the cropped camera viewer 720 on the display screen 704. In examples where a portion of the viewer 720 occupies the entire width of the display screen 704, two or more greyed-out portions may be included (e.g., above and below the viewer 720). The greyed-out portion 722 can provide a reduced visibility view, when compared with the view of the cropped camera viewer 720, of the subjects or surrounding environment that are the focus of the to-be-captured photograph or video. In some examples, the portion 722 may be blacked out.

FIG. 1G depicts the mobile computing device 700 presenting a cropped camera viewer 724 on the display screen 704 of the device 700. The cropped camera viewer 724 may include one or more of an aspect ratio, shape, size, area, scope, coverage, or one or more dimensions that correspond to or match a corresponding parameter of a photograph to be included with a print media item. In this example, the cropped camera viewer 724 has a diamond shape. The diamond-shaped cropped camera viewer 724 does not occupy the entire width of the display screen 704 in this example, but in some examples a portion of the diamond-shaped viewer 724 may span the entire width (or length) of the display screen 704. In some examples, the cropped camera viewer 724 may have a different orientation on the screen 704. For example, the viewer 724 may be rotated by a particular amount (e.g., by a particular number of degrees). A shaded or grey-out portion 726, in this example, is shown surrounding the cropped camera viewer 724 on the display screen 704. In examples where a portion of the viewer 724 occupies the entire width of the display screen 704, two or more greyed-out portions may be included (e.g., above and below the viewer 724). In examples where a portion of the viewer 724 occupies the entire length of the display screen 704, two or more greyed-out portions may be included (e.g., left and right of the viewer 724). The greyed-out portion 726 can provide a reduced visibility view, when compared with the view of the cropped camera viewer 724, of the subjects or surrounding environment that are the focus of the to-be-captured photograph or video. In some examples, the portion 726 may be blacked out.

Figure 1I:
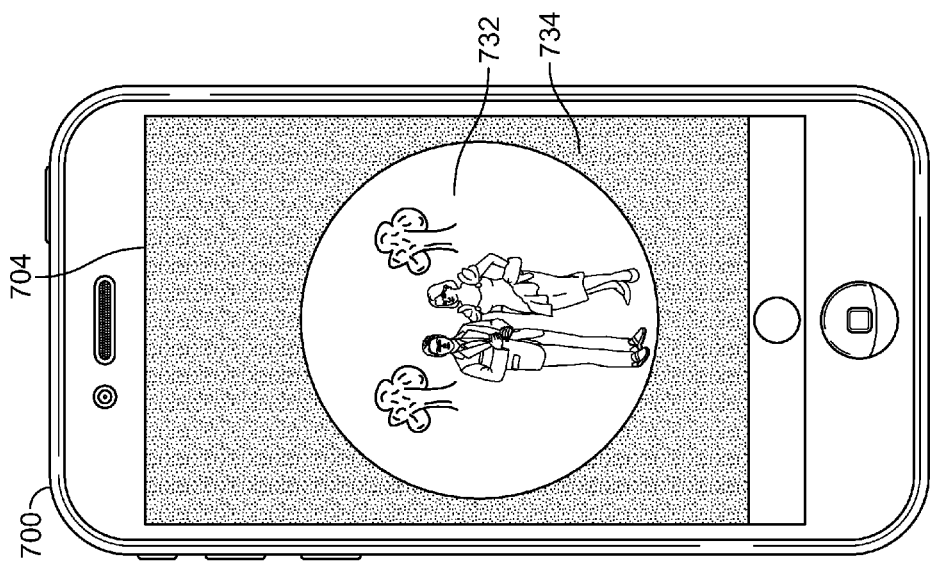
Figure 1H:
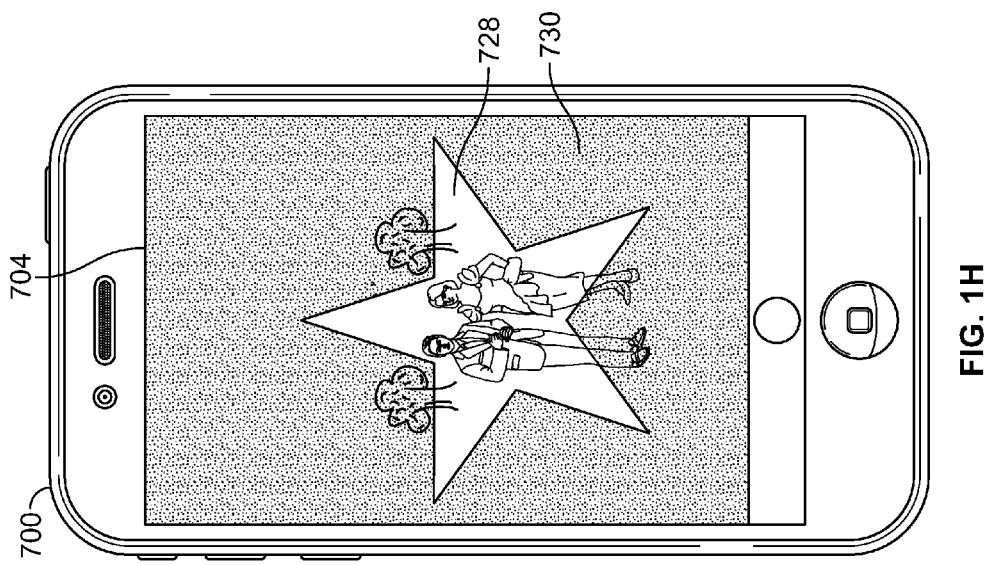

FIG. 1H depicts the mobile computing device 700 presenting a cropped camera viewer 728 on the display screen 704 of the device 700. The cropped camera viewer 728 may include one or more of an aspect ratio, shape, size, area, scope, coverage, or one or more dimensions that correspond to or match a corresponding parameter of a photograph to be included with a print media item. In this example, the cropped camera viewer 728 has a star shape. The star-shaped cropped camera viewer 728 does not occupy the entire width of the display screen 704 in this example, but in some examples a portion of the star-shaped viewer 728 may span the entire width (or length) of the display screen 704. In some examples, the cropped camera viewer 728 may have a different orientation on the screen 704. For example, the viewer 728 may be rotated by a particular amount (e.g., by a particular number of degrees). A shaded or grey-out portion 730, in this example, is shown surrounding the cropped camera viewer 728 on the display screen 704. In examples where a portion of the viewer 728 occupies the entire width of the display screen 704, two or more greyed-out portions may be included (e.g., above and below the viewer 728). In examples where a portion of the viewer 728 occupies the entire length of the display screen 704, two or more greyed-out portions may be included (e.g., left and right of the viewer 728). The greyed-out portion 730 can provide a reduced visibility view, when compared with the view of the cropped camera viewer 728, of the subjects or surrounding environment that are the focus of the to-be-captured photograph or video. In some examples, the portion 730 may be blacked out.

FIG. 1I depicts the mobile computing device 700 presenting a cropped camera viewer 732 on the display screen 704 of the device 700. The cropped camera viewer 732 may include one or more of an aspect ratio, shape, size, area, scope, coverage, or one or more dimensions that correspond to or match a corresponding parameter of a photograph to be included with a print media item. In this example, the cropped camera viewer 732 has a circle shape. The circle-shaped cropped camera viewer 732 does not occupy the entire width of the display screen 704 in this example, but in some examples a portion of the circle-shaped viewer 732 may span the entire width of the display screen 704. A shaded or grey-out portion 734, in this example, is shown surrounding the cropped camera viewer 732 on the display screen 704. In examples where a portion of the viewer 732 occupies the entire width of the display screen 704, two or more greyed-out portions may be included (e.g., above and below the viewer 732). The greyed-out portion 734 can provide a reduced visibility view, when compared with the view of the cropped camera viewer 732, of the subjects or surrounding environment that are the focus of the to-be-captured photograph or video. In some examples, the portion 734 may be blacked out.

Figure 1J:
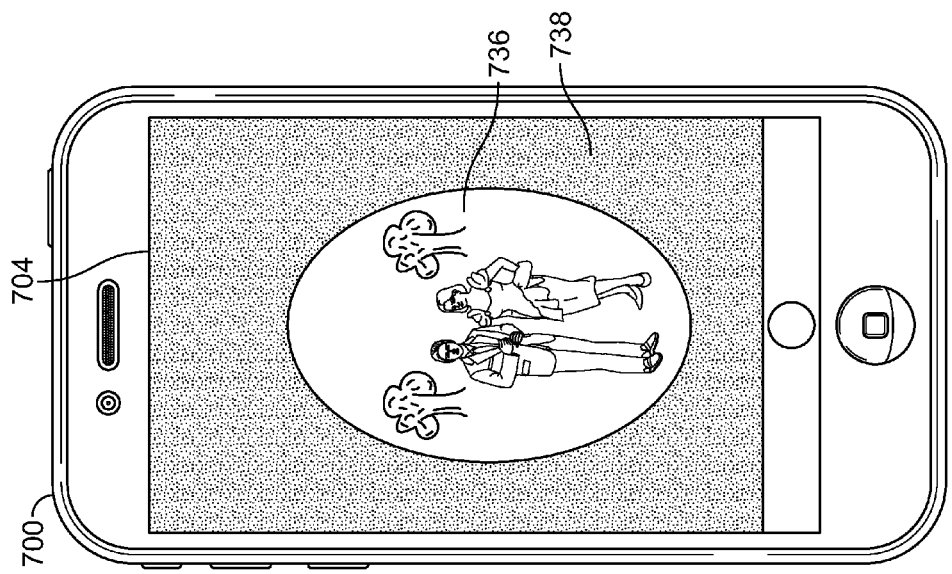

FIG. 1J depicts the mobile computing device 700 presenting a cropped camera viewer 736 on the display screen 704 of the device 700. The cropped camera viewer 736 may include one or more of an aspect ratio, shape, size, area, scope, coverage, or one or more dimensions that correspond to or match a corresponding parameter of a photograph to be included with a print media item. In this example, the cropped camera viewer 736 has an elliptical shape. The ellipse-shaped cropped camera viewer 736 does not occupy the entire length of the display screen 704 in this example, but in some examples a portion of the ellipse-shaped viewer 736 may span the entire length (or width) of the display screen 704. In some examples, the cropped camera viewer 736 may have a different orientation on the screen 704. For example, the viewer 736 may be rotated by a particular amount (e.g., by a particular number of degrees). A shaded or grey-out portion 738, in this example, is shown surrounding the cropped camera viewer 736 on the display screen 704. In examples where a portion of the viewer 736 occupies the entire length of the display screen 704, two or more greyed-out portions may be included (e.g., left and right of the viewer 736). In examples where a portion of the viewer 736 occupies the entire width of the display screen 704, two or more greyed-out portions may be included (e.g., above and below the viewer 736). The greyed-out portion 738 can provide a reduced visibility view, when compared with the view of the cropped camera viewer 736, of the subjects or surrounding environment that are the focus of the to-be-captured photograph or video. In some examples, the portion 738 may be blacked out.

Figure 1K:
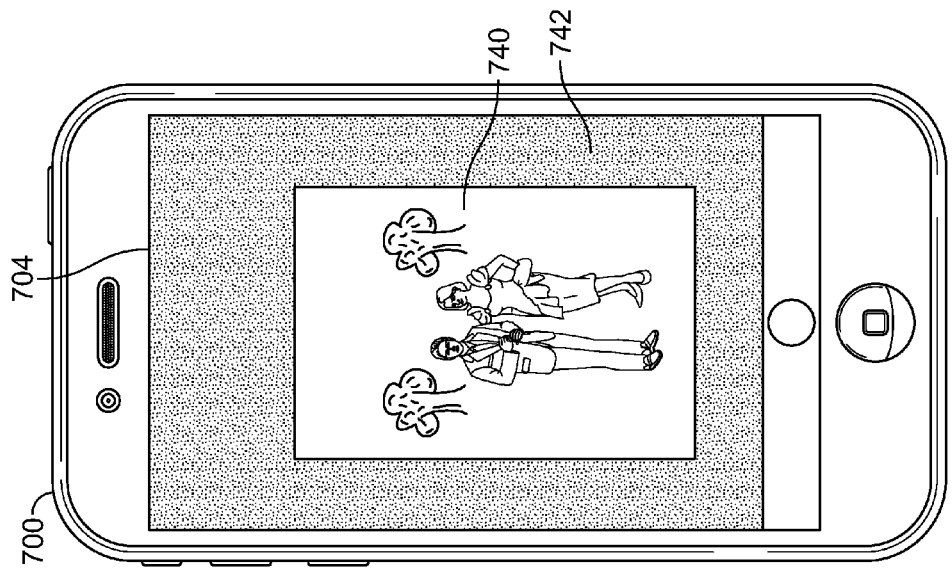

FIG. 1K depicts the mobile computing device 700 presenting a cropped camera viewer 740 on the display screen 704 of the device 700. The cropped camera viewer 740 may include one or more of an aspect ratio, shape, size, area, scope, coverage, or one or more dimensions that correspond to or match a corresponding parameter of a photograph to be included with a print media item. In this example, the cropped camera viewer 740 has a rectangle shape. The rectangle-shaped cropped camera viewer 740 does not occupy the entire length of the display screen 704 in this example, but in some examples the rectangle-shaped viewer 740 may span the entire length (or width) of the display screen 704. In some examples, the cropped camera viewer 740 may have a different orientation on the screen 704. For example, the viewer 740 may be rotated by a particular amount (e.g., by a particular number of degrees). A shaded or grey-out portion 742, in this example, is shown surrounding the cropped camera viewer 740 on the display screen 704. In examples where the viewer 740 occupies the entire length of the display screen 704, two or more greyed-out portions may be included (e.g., left and right of the viewer 740). In examples where the viewer 740 occupies the entire width of the display screen 704, two or more greyed-out portions may be included (e.g., above and below the viewer 740). The greyed-out portion 742 can provide a reduced visibility view, when compared with the view of the cropped camera viewer 740, of the subjects or surrounding environment that are the focus of the to-be-captured photograph or video. In some examples, the portion 742 may be blacked out.

Referring again to FIG. 1A, as indicated at step E (134), the first mobile computing device 102 can capture or take a photograph. In some examples, the photograph may be a high-resolution photograph. In some examples, the photograph may be a high-definition photograph. In some examples, the resolution of the photograph may be the highest resolution supported by the camera of the first mobile computing device 102. The photograph may include one or more of an aspect ratio, shape, size, area, scope, coverage, or one or more dimensions that correspond to or match a corresponding parameter of a photograph to be included with a print media item, or a placeholder, such as a photograph placeholder, of a print media template, and which also match the corresponding parameter of the cropped camera viewer 128.

In some examples, the photograph may be captured in response to an input received by the first mobile computing device 102, such as a start input (e.g., provided by the user of the device via a user interface feature). In some examples, the first mobile computing device 102 may take a single photograph. In some examples, the first mobile computing device 102 may take multiple (e.g., 2, 3, 4, 5, 6, 7, 8, or more) photographs. The captured photograph (e.g., an electronic representation of the photograph) may be stored in a memory location of the first mobile computing device 102.

As indicated at step F (136), the first mobile computing device 102 can record a video. In some examples, a resolution of the video may be lower than the resolution of the photograph captured at step E (134). For example, the resolution of the video may be about 720 pixels×720 pixels. In some examples, the photograph captured at step E (134) may be different from any of the individual frames of the video recorded at step F (136). In some examples, the video may be recorded at step F (136) after the photograph has been captured or taken at step E (134). The video may include an aspect ratio, shape, size, area, scope, coverage, or one or more dimensions that correspond to or match a corresponding parameter of a photograph to be included with a print media item, or a placeholder, such as a photograph placeholder, of a print media template, and which also match the corresponding parameter of the cropped camera viewer 128 and the captured photograph. The recorded video file may be stored in a memory location of the first mobile computing device 102. In some examples, the first mobile computing device 102 can record more than one video (e.g., two, three, four, or more videos), and the one or more additional videos can optionally be used for alternative reality experiences associated with additional print media items, for example.

As Indicated at optional step G (137), the first mobile computing device 102 can present, on the display screen 126, the captured photograph that was captured at step E (134) and/or the recorded video that was recorded at step F (136). In some examples, the first mobile computing device 102 can receive one or more inputs to edit the captured photograph. In some examples, the first mobile computing device 102 can receive one or more inputs to edit the recorded video, for example to delete one or more portions of the recorded video (e.g., to shorten the video). In examples where more than one photograph is captured at step E (134), the first mobile computing device 102 can receive an input to select one of the captured photographs (e.g., after presenting the photographs on the display screen). In some examples, the first mobile computing device 102 can receive an input to save the captured photograph (or a selected photograph if more than one photograph was captured) and the recorded video (or an edited version of the recorded video). In some examples, step G (137) may be omitted.

As indicated at step H (138), the first mobile computing device 102 can associate the recorded video with the captured photograph. For example, a link (e.g., an electronic link) may be established between the captured photograph and the recorded video. In some examples, the recorded video may be uniquely associated with the captured photograph, for example as provided by the link between the captured photograph and the recorded video. As an alternative example of association, the captured photograph and the recorded video can be included in a single file structure, while in other examples the captured photograph and the recorded video can be represented by separate files structures. In some examples, the recorded video and the captured photograph can be uniquely associated with one another based on a naming convention. For example, the photo and video may be provided a common prefix, suffix, extension, name or portion of a name, or the like. In some examples, the captured photograph and the recorded video may be stored in the same folder, or may be transmitted to the computer system 104 as part of a same message or group of messages (or message packets or payloads, e.g.), or in the same application program interface (api), which may provide additional alternatives for associating the captured photograph and the recorded video.

As indicated at step I (140), the first mobile computing device 102 can provide the captured photograph and the recorded video to the computer system 104. For example, the first mobile computing device 102 may transmit, for receipt by the computer system 104, the captured photograph and the recorded video. In some examples, in addition to providing the captured photograph and the recorded video, the first mobile computing device 102 provides additional information, such as information regarding the association of the captured photograph with the recorded video, or additional information regarding the captured photograph, the recorded video, the first mobile computing device 102 or an account associated with the first mobile computing device.

In various implementations, the computer system 104 can provide a security feature to assure that only the recorded video, and not an alternative video, is presented as part of an augmented reality experience in response to a receipt of a scanned image of the captured photograph, such as a scan of a print media item that includes the captured photograph. In some examples, the first mobile computing device 102 can include a security feature, such as an identifier (e.g., a QR code or other appropriate type of identifier) with the captured photograph, and the computer system 104 can use the identifier in assuring that the proper video is presented when providing the augmented reality experience. This may be used, for example, to guard against unwanted association of the captured photograph (or another representation of the captured photograph or of the subjects of the captured photograph) with an alternative and potentially unrelated, irrelevant, offensive, or harmful video. The first mobile computing device 102 may provide the security feature at step I (140), in some implementations. In some examples, the first mobile computing device 102 may provide the security feature at step H (138), in addition to associating the captured photograph with the recorded video.

In some examples, the first mobile computing device 102 may include a first security feature, such as a first identifier (e.g., a QR code or other appropriate type of identifier) with the captured photograph to indicate a desired association with the recorded video, and may include a second security feature, such as a second identifier (e.g., a QR code or other appropriate type of identifier) with the captured photograph (or with a second version of the captured photograph, for example) to indicate a desired association with an alternative video (e.g., an alternative video recorded by the first mobile computing device 102 or by another device). In this manner, a user may associate a given captured photograph with alternative augmented reality content (e.g., alternative videos), which may be useful, for example, if the user would like to associate the captured photograph with a first video for a first printed media item, and would like to associate the captured photograph with a second video for a second printed media item.

As indicated at step J (142), the first mobile computing device 102 can receive information from the computer system 104. In some examples, the information can include a confirmation that the photograph and video were received at step I (140). In some examples, the received information can include an image of the captured photograph, a return of the captured photograph, or a return of the captured photograph including additional information with the captured photograph (or with an image of the captured photograph). In some examples, the information can include information or options regarding print media, the print media item, or a portion of the print media item. In some examples, the received information can include a template for the print media item. In some examples, the information can include checkout or ordering information.

As indicated at optional step K (144), the first mobile computing device 102 can present print media information on the display 126 of the device. For example, the first mobile computing device 102 may present a selection of print media options, or may present a print media template. In some examples, the first mobile computing device 102 may present, on display screen 126, a print media template or an image of a print media item with the pre-cropped, high-resolution photograph that was captured at step E (134).

In some examples, the first mobile computing device 102 can present print media ordering information, delivery information, and payment information on the display 126 of the device, and may receive one or more inputs related to the ordering information, delivery information and payment information (not shown in FIG. 1A). Examples of ordering information that may be presented, and for which inputs may be received, can include information relating to a quantity of print media items to be ordered, promotional code or coupon information, pricing information, upgrade or option information, or print media type or style information. Examples of delivery information that may be presented, and for which inputs may be received, can include information relating to a delivery method (e.g., Ground, Next-day delivery, Two-day delivery, and the like), address information, such as a delivery address for a recipient of the print media item, or options for providing delivery or contact information, such as by entering address information or an option to search a contact database of the first mobile computing device and use an address of a selected contact. Examples of payment information that may be presented, and for which inputs may be received, can include a credit card number and associated information, a bank or deposit account number and associated information, payment processor and related information, or other information related to paying for an order. In some examples, optional step K (144) may be omitted.

In some examples, the first mobile computing device 102 may receive an input, which may be provided by the user by selecting a user interface feature, for example, relating to one or more of the options presented at step K (144), for examples where optional step K (144) is used to present print media options. In some examples, the first mobile computing device 102 may receive print media edit information (not shown in FIG. 1A), such as text or other information (e.g., image, graphic) that the user wishes to add to the print media item, and may display the received text or other information on the displayed print media item.

As indicated at optional step L (146), the first mobile computing device 102 can provide information to the computer system 104 or to another computer system 147. For example, the first mobile computing device 102 may provide to the computer system 104 or to the another computer system 147 the captured photograph, an image of the captured photograph, or a version of the captured photographed received at step J (142) from the computer system 104. As additional examples, the first mobile computing device may provide to the computer system 104 or to the another computer system 147 information including ordering information, delivery information, or payment information received at step K (144). The computer system 104 or the another computer system 147 may receive the provided information, and may store the information in repository 108. In some examples, repository 108 may be accessible by computer system 104. In some examples, repository 108 may be accessible by the another computer system 147. In some examples, repository 108 (or one or more portions of repository 108) may be accessible by computer system 104 and by the another computer system 147. In some examples, step L (146) may be omitted.

As indicated at step M (148), the computer system 104 or the another computer system 147 can cause the physical print media items to be created. While computer system 104 and the another computer system 147 are depicted in FIG. 1A as single systems, in some examples computer system 104 or the another computer system 147 (or both) may represent two or more systems, including two or more systems located remotely from one another. In some examples computer system 104 may generally perform functions associated with augmented reality aspects of the augmented reality presentation, and the another computer system 147 may generally perform functions associated with the physical print media items and their creation. Regarding creating the physical print media items, the computer system 104 or the another computer system 127 may interface with printing equipment 150 to create the print media items. The print media items may be delivered to intended recipients of the print media items, according to various implementations.

Example steps N-S, which are depicted as being performed across the second mobile computing device 106 and the computer system 104, are an example of steps that can be used to provide an augmented reality experience. As described above, mobile computing device 106 may be a smartphone or a tablet computing device, but more generally can be any of a variety of appropriate computing devices that include a camera capable of capturing or taking a photograph, or that are capable of scanning a card or a photograph. Examples of alternative devices can include a personal digital assistant, a laptop computer, a desktop computer, a wearable computing device (e.g., a smart-watch or a smart-bracelet), or other appropriate computing devices. The mobile computing device 106 can communicate with the computer system 104 over one or more appropriate communication networks, such as the Internet, or one or more local area networks (LANs), wide area networks (WANs), cellular networks, virtual private networks (VPNs), wireless networks (e.g., Wi-Fi networks, mobile data networks (e.g., 3G/4G networks)), wired networks (e.g., fiber optic networks), other appropriate network, or any combination thereof.

As indicated in step N (152), the second mobile computing device 106 can receive a scan input. The scan input may be provided by a user of the second mobile computing device 106, as by selection of a user interface feature, for example, and may indicate that the user desires to scan an augmented reality print media item in anticipation of being presented an augmented reality experience.

As indicated at step O (154), the second mobile computing device 106 can scan a print media item, or a portion of the print media item (e.g., a photograph of the print media item). In some examples, the second mobile computing device 106 takes a photograph of the print media item or a portion of the print media item. In some examples, the second mobile computing device 106 scans and recognizes or identifies a portion of the print media item (e.g., recognizes or identifies the photograph on the print media item).

As indicated at step P (156), the second mobile computing device 106 can provide information relating to the scanned print media item to the computer system 104. In some examples, the second mobile computing device 106 provides a photograph, which in some examples is captured at step O (154), of the print media item or portion of the print media item to the computer system 104. In some examples, the second mobile computing device 106 provides an indication of the recognition or identification of the photograph of the print media item to the computer system 104.

As indicated at step Q (158), the computer system 104 can identify augmented reality content based on the received information relating to the scanned print media item (received at step P, 156). For example, the computer system 104 can identify the photograph included on the print media item (e.g., the photograph captured by the first mobile computing device 102 at step E (134) and provided to the computer system 104 at step I (140) and included on the print media item), and can then identify, based on an association or link between the photograph and a video, the video that was associated with the photograph (e.g., the video recorded by the first mobile computing device 102 at step F (136), associated with the photograph at step H (138), and provided to the computer system 104 at step I (140)). The computer system 104 can retrieve the identified augmented reality content, for example from the repository 108. In some examples, prior to identifying the augmented reality content, the computer system 104 can analyze information received (e.g., a photograph of the print media item or portion of the print media item captured by second mobile computing device 106) from the second mobile computing device 106 at step P (156), and can recognize or identify a portion of the print media item (e.g., recognize or identify the photograph on the print media item). The computer system 104 can then use this information in identifying the augmented reality content, for example.

As indicated at step R (160), the second mobile computing device 106 can receive augmented reality content from the computer system 104. For example, the second mobile computing device 106 can receive the video file identified by the computer system 104 at step Q (158), and can receive information relating to presenting the augmented reality content, such as where to present the video with reference to the view of the print media item.

As indicated at step S (162), the second mobile computing device 106 can present the augmented reality content. In some examples, the second mobile computing device 106 presents an augmented reality experience by presenting, on its display screen, a view of the print media item and the photograph included on the print media item, and then presents the video that is associated with the photograph such that the video appears to "pop" or spring from the photograph. For example, the video can be presented in a relation to the photograph on the print media item, such that when the video begins to play the subject or subjects of the photograph on the print media item appear to spring to life, where previously they had appeared stationary in the photograph.

Figure 2:
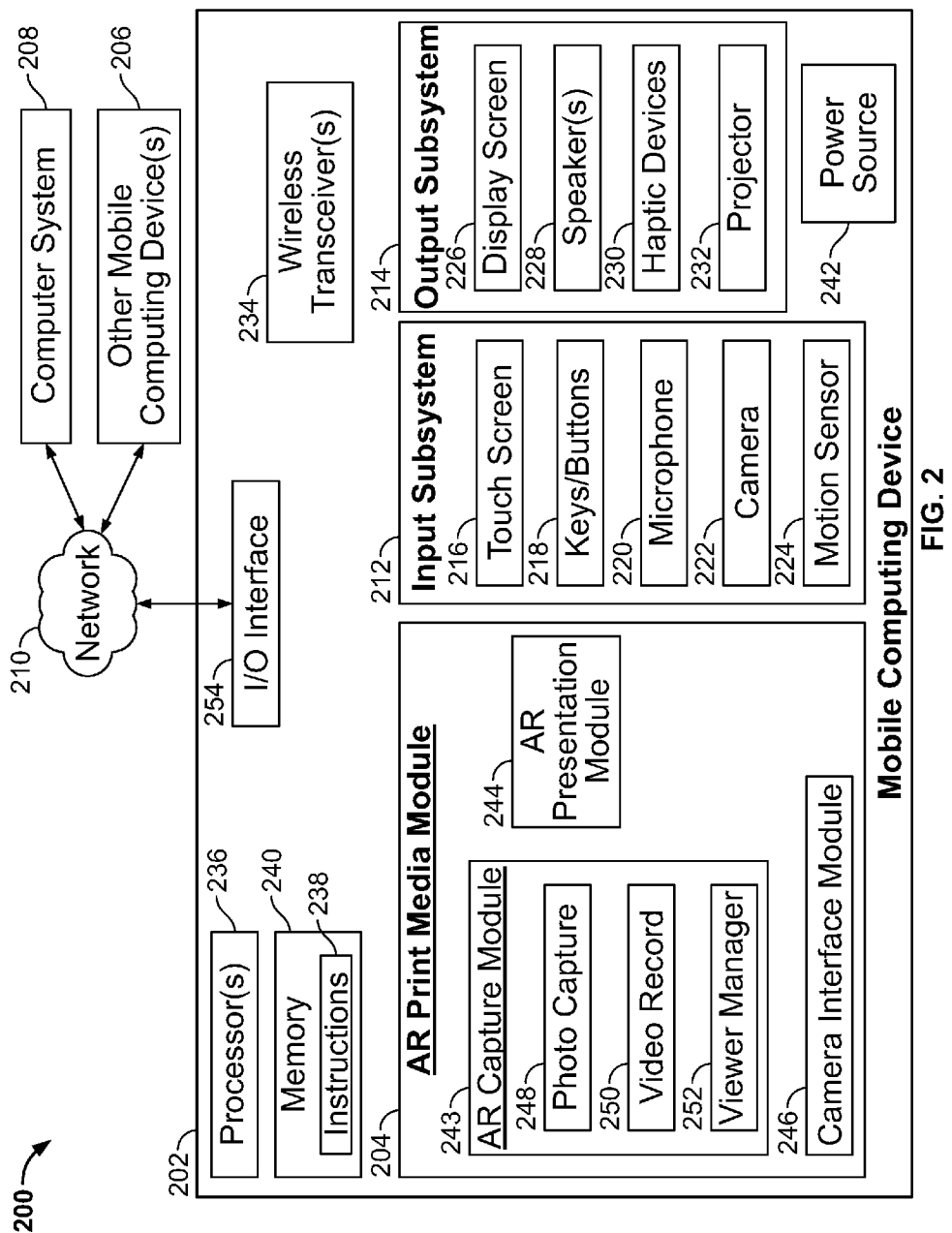
FIG. 2 is a conceptual diagram of an example system, including a block diagram of an example mobile computing device that includes an augmented reality print media item module.

FIG. 2 is a conceptual diagram of an example system 200, including a block diagram of an example mobile computing device 202 that includes an augmented reality print media module 204. Mobile computing device 202 may correspond to any of the mobile computing devices discussed herein, and may be in various examples and without limitation, a smartphone, a tablet computing device, a laptop computer, a wearable computing device, a personal digital assistant, or other appropriate mobile computing device.

The example system 200 is depicted as including the mobile computing device 202, other mobile computing devices 206, one or more computer systems 208 associated with augmented reality print media items or related aspects, and a network 210. The mobile computing device 202 (as well as the other mobile computing devices 206) can be similar to the mobile computing device 102 (or device 106) described above with reference to FIG. 1A. The one or more computer systems 208 can be similar to the computer system 104 or the another computer system 147 described above with reference to FIG. 1A. The network 210 can be one or more appropriate communication networks, such as the Internet, or one or more local area networks (LANs), wide area networks (WANs), cellular networks, virtual private networks (VPNs), wireless networks (e.g., Wi-Fi networks, mobile data networks (e.g., 3G/4G networks)), wired networks (e.g., fiber optic networks), other appropriate network, or any combination thereof.

The mobile computing device 202 includes an input subsystem 212 and an output subsystem 214 through which input can be received from users and output can be provided to users by the mobile computing device 202, respectively. The input subsystem 212 includes a touchscreen 216 (e.g., touch sensitive display, touch sensitive surface, touch sensitive housing, presence sensitive surface), keys and/or buttons 218, microphone(s) 220, one or more cameras 222 (e.g., rear-facing camera, forward-facing camera, 3D camera), motion sensors 224 (e.g., accelerometers, gyroscopes), and/or other appropriate technologies. The output subsystem 214 includes a display screen 226 (e.g., LCD display, LED display), one or more speakers 228, one or more haptic devices 230 (e.g., vibration generating devices, tactile displays), and in some examples, a projector 232, and/or other appropriate technologies. In some implementations, portions of the input and output subsystems 212 and 214 can be configured to provide additional inputs and outputs on the mobile computing device 202.

The mobile computing device 202 additionally includes one or more wireless transceivers 234 (e.g., one or more wireless transmitters and one or more wireless receivers) for communicating over one or more wireless communication technologies. For example, the wireless transceivers 234 can include one or more appropriate wireless transceivers, such as wireless radio transceivers like Wi-Fi transceivers, short-range wireless transceivers (e.g., BLUETOOTH transceivers), cellular network transceivers, NFC, and/or mobile data network transceivers (e.g., 3G/4G transceivers).

The mobile computing device 202 additionally includes one or more processors 236 (e.g., one or more CPU's, such as single core, dual core, quad core CPU's) configured to execute instructions 238 (e.g., binaries, object code, scripts) that are stored/loaded into memory 240 (e.g., RAM, ROM, Flash) of the mobile computing device 202. The one or more processors 236 can execute instructions of any of a variety of types to perform tasks at the computing device 202, including tasks or operations discussed herein with reference to mobile computing devices. The mobile computing device 202 can additionally include one or more power sources 242 (e.g., battery) or backup power sources, or power connections (e.g. to an outlet), or solar or other power inputs.

In some implementations, the AR print media module 204 includes an AR capture module 243, an AR presentation module 244, and a camera interface module 246. The camera interface module 246 interfaces with the camera 222, to make the camera 222 available for photograph-capture and video recording. The AR capture module 243 includes a photo capture module 248, a video record module 250, and a viewer manager 252. The photo capture module 248 can manage photograph capture for the AR capture module 243, such as to capture a photograph as described above with reference to step E (134) in FIG. 1A. The video record module 250 can manage video recording for the AR capture module 243, such as to record a video as described above with reference to step F (136) in FIG. 1A. The viewer manager 252 can present a cropped camera viewer, such as any of the cropped camera viewers described herein (e.g., viewers 128, 702, 708, 712, 716, 720, 724, 728, 732, 736, 740, 312), for example in place of the traditional camera viewer that may be provided by the camera 222 in the absence of AR print media module 204 or when AR print media module 204 is not in use (such as when camera 222 is used to take photographs or record videos not intended for use with an AR print media item, for example). In some examples, the viewer manager 252 is configured to present a pre-cropped camera viewer that includes one or more of an aspect ratio, shape, size, area, scope, coverage, or one or more dimensions that correspond to or match a corresponding parameter of a photograph to be included with a print media item, or a placeholder, such as a photograph placeholder, of a print media template. The AR presentation module 244 can be used to present an augmented reality experience to a user, for example, such as described above with reference to step S (162) of FIG. 1A.

The mobile computing device 202 includes an input/output (I/O) interface 254 that is configured to communicate with other computing devices over the network 210. For example, mobile computing device 202 can use I/O interface 254 to communicate over network 210 with the one or more computer systems 208, with other mobile computing devices 206, or with other computing devices having access to network 210. The I/O interface 254 can be any of a variety of appropriate interfaces, such as a wired interface (e.g., Ethernet card) and/or wireless interface (e.g., wireless transceivers 234, wireless chips, and one or more antennas).

Although not depicted in FIG. 2, the mobile computing device 202 can include a data store that can be used to store information associated with capturing augmented reality content, presenting augmented reality content, ordering augmented reality print media items, and the like. Such information can be stored in memory 240 in some examples.

FIG. 3A depicts an example mobile computing device displaying a screen shot of an example user interface 300 through which a user may select to create content for an augmented reality print media item or scan an augmented reality print media item. User interface 300 may be presented on a display screen 303 of a mobile computing device 304. In some examples, mobile computing device 304 may correspond to the first mobile computing device 102 (see FIG. 1A). A user may select a first area 302 (labeled "Create Content for Print Media Item") of the user interface 300 (indicated in FIG. 3A by the depicted hand selecting area 302), and the mobile computing device may receive the selection as a create input. In response to receiving the create input, the mobile computing device may present a cropped camera viewer for capturing a photograph and recording a video.

FIG. 3B depicts an example mobile computing device 304 displaying a screen shot of an example user interface 306 through which a user may provide one or more dimensions. User interface 306 may be presented on a display screen 303 of a mobile computing device 304. In some examples, mobile computing device 304 may correspond to the first mobile computing device 102 (see FIG. 1A). In some examples, a user may provide a first dimension (e.g., a "height" dimension) in a first input field 307, and may provide a second dimension (e.g., a "width" dimension) in a second input field 308. In some examples, the one or more dimensions may correspond to the dimensions of a photograph placeholder for the print media item. The user may provide the one or more dimensions in a variety of ways, such as by typing or entering the dimensions via a user interface feature (e.g., touch screen input, keyboard) or by voice input for devices that include voice recognition functionality. In some examples, the user may select a dimension from a list (e.g., a drop-down list) of predetermined dimensions (not shown in FIG. 3B).

FIG. 3C depicts an example mobile computing device 304 displaying a screen shot of an example user interface 309 through which a user may provide one or more dimensions, shapes, or other augmented reality print media parameters. In addition to the height field 307 and width field 308, a radius input field 311 (or multiple radius input fields) may be used to receive a radius dimension (or multiple radius dimensions). A shape field 313 provides a list of predetermined shapes (e.g., square, rectangle, circle, ellipse, diamond, triangle, heart, star) that may be selected. In other examples, additional or fewer shapes may be included as options. A rotate field 315 may be used to receive a rotation parameter, such as a number of degrees by which the shape should be rotated from a neutral position, for example (e.g., rotated clockwise by the specified number of degrees from a neutral or default position).

In some examples, the mobile computing device may use the received one or more dimensions to determine an aspect ratio. The mobile computing device may use the received one or more dimensions to determine a relationship between a width and a height, such as a proportional relationship between the width and the height. The determined aspect ratio may correspond to an aspect ratio for the photograph to be included with the print media item, in some examples, and may also be used in presenting a cropped camera viewer, in capturing a photograph, and in recording a video. For example, the mobile computing device may present a cropped camera viewer having the determined aspect ratio, may capture one or more photographs having the determined aspect ratio, and may record one or more videos having the determined aspect ratio. With reference again to FIG. 3B, a user has entered a width of 6.0 in the width input field 308, and has entered a height of 8.0 in the height input field 307. Based on these inputs, for example, the mobile computing device may determine an aspect ratio of 3:4, as by taking a ratio of the entered width over the entered height, and optionally reducing the ratio by dividing each of the width and the height by a common factor (e.g., by a greatest common factor of the width and the height).

In some examples, the mobile computing device may determine the aspect ratio based on the received one or more dimensions and additionally based on properties of a shape, where in some examples an input that specifies a shape is also received as described above. In some examples, the mobile computing device may determine the aspect ratio based on the received one or more dimensions and on additional information, such as information previously stored at the mobile computing device or received from the computer system 104 (e.g., one or more properties of a particular shape). In some examples, a predetermined shape, such as a rectangle, may be used as a default shape for the cropped camera viewer, the photograph to be captured, and the video to be recorded.

FIG. 4 depicts an example mobile computing device displaying a screen shot of an example user interface 310 through which a user may initiate capture of a photograph and recording of a video for an augmented reality print media item. As can be seen in FIG. 4, presented on the display 303 of the mobile computing device 304 is a cropped camera viewer 312. In this example, based on the received dimension inputs shown in FIG. 3B and the determined aspect ratio of 3:4, the mobile computing device presents the cropped camera viewer 312 with a rectangular shape and with an aspect ratio of about 3:4. The cropped camera viewer 312 occupies an area or portion of the display screen 303 that is less than the entire display screen 303 or entire area of the display screen 303, in contrast, for example, to a camera viewer of a traditional smartphone that typically occupies the entire area of the display of the smartphone. In some examples, the cropped camera viewer 312 occupies an area of the display screen that is about 75% of the area of the entire display screen. In some examples, the cropped camera viewer 312 occupies an area of the display screen that is about half of the area of the entire display screen. In some examples, the cropped camera viewer 312 occupies an area of the display screen that is less than half of the area of the entire display screen.

In some examples, the cropped view 312 includes an aspect ratio, shape, size, area, scope, coverage, or one or more dimensions of a photograph or video to be associated with the print media item. For example, the cropped camera viewer 312 may be configured to have the same aspect ratio as the aspect ratio of a placeholder for a photograph for a print media item or for a template for a print media item. Because the aspect ratio of the cropped camera viewer 312 may match the aspect ratio of a photograph to be included on a print media item, and of a video to be presented as an augmented reality experience of an augmented reality print media item, the user of the mobile device 304 may enjoy an accurate representation of how a photograph or video captured or recorded by the mobile computing device 304 may appear on the print media item or may be presented with the augmented reality experience, according to some implementations. In some examples, one or more of the dimensions (e.g., height and width) of the cropped camera viewer 312 may be the same as one or more of the dimensions of a placeholder for a photograph on a print media item or print media item template, and in other examples one or more of the dimensions of the cropped camera viewer 312 may be different from the one or more of the dimensions of a placeholder for a photograph on a print media item or print media item template.

A family is shown in the cropped camera viewer 312, and in this example the family (a father, mother, and child) represents the subjects of the photograph and/or video. A shaded portion 314 (or greyed-out portion) of the display screen 303 shows, at a diminished display intensity as compared to a display intensity of the cropped camera viewer 312, the environment about the subjects, and in this example shows at the diminished or decreased display intensity the environment and portions of the subjects (e.g., areas below the waists of the adults and below the chest of the child) that are not included in the cropped camera viewer 312. In this example, the shaded portion 314 includes a shaded portion above, below, left, and right of the cropped camera viewer 312.

A camera control 316, which may be a user-interface feature, is presented, and may be selected by a user of the device. In this example, the camera control 316 is presented below the cropped camera viewer 312 and the shaded portion 314 of the display 303. In this example, the camera control 316 is presented in a control area 318 of the display, where additional controls or user interface features may be included in some examples. In some examples, the control area 318 may be blacked-out, and may be located at or near the bottom of the display 303.

The mobile computing device 304 may receive an input via the camera control 316, and may capture a high-resolution photograph in response to receiving the input. In some examples, a single high-resolution photograph can be captured in response to receipt of a camera control input. In some examples, multiple high-resolution photographs can be captured in response to receipt of a camera control input. In some examples, receipt of the camera control input causes a high-resolution photograph to be captured, and also causes a video to be recorded. Upon receipt of the camera control input, the mobile computing device may first capture a high-resolution photograph, and may then record a video after capturing the high-resolution photograph. Aspect ratios of the captured photograph and the recorded video may match the determined aspect ratio, and may match the aspect ratio of the cropped camera viewer 312.

FIG. 5A depicts an example mobile computing device displaying a screen shot of an example user interface 330 through which a user may monitor capturing of a photograph for an augmented reality print media item. The cropped camera viewer 312 provides a view of the subjects as the photograph is being captured, according to some examples. In some examples, the shaded portion 314 presents, at the diminished display intensity, the environment about the subjects, and in this example shows at the diminished or decreased display intensity the environment and portions of the subjects that are not included in the cropped camera viewer 312. A camera control feature 334 may be presented as a user interface feature, and may be selected by the user initiate the photograph capture.

FIG. 5B depicts an example mobile computing device displaying a screen shot of an example user interface 340 through which a user may monitor recording of a video for an augmented reality print media item. The cropped camera viewer 312 provides a view of the subjects as the video is being recorded, according to some examples. In some examples, the shaded portion 314 presents, at the diminished display intensity, the environment about the subjects, and in this example shows at the diminished or decreased display intensity the environment and portions of the subjects that are not included in the cropped camera viewer 312. In some examples, recording of the video may start as soon as the one or more photographs are captured. In some examples, a user can initiate recording of the video by selecting user interface feature 334, for example.

In some examples, a duration of the video can be limited to a predetermined duration. For example, a video may be restricted to a duration of four minutes or less, or other appropriate duration. A countdown timer 332 may be presented on the display 303, and may inform the user of a maximum time remaining for the video. A camera control feature 334 may be presented as a user interface feature, and may be selected by the user to end the recording of the video, in some examples.

FIG. 6 depicts an example mobile computing device displaying a screen shot of an example user interface 350 through which a user may preview a recorded video for an augmented reality print media item. As can be seen in FIG. 6, the area previously occupied by the lower shaded portion 314 (see FIGS. 4, 5A and 5B) has been replaced by a blacked-out portion 352 of the display. In some examples, the upper portion of the shaded portion may also be blacked out (depicted as shaded in FIG. 6), and a message (e.g., "Happy with the Result?") may be displayed over the blacked out portion. A user of the mobile device computing 304 may preview the video by selecting a "play video" control 354, and in response the mobile computing device 304 may play the recorded video. If the user is satisfied with the video, the user may select a "Use This" control 356. If the user is not satisfied with the video, the user may select a "Retake" control 358 to record a new video. In some examples, the mobile computing device 304 may display a preview of the captured high-resolution photograph (not shown), and the user may be given the option of accepting the photograph. In examples where more than one high-resolution photograph is captured, the user may be allowed to preview the more than one high-resolution photographs and select one of the high-resolution photographs.

FIG. 7 depicts an example mobile computing device displaying a screen shot of an example user interface 370 through which a user may select to save the captured photograph and recorded video. In some examples, when the mobile computing device 304 receives an input via a "Save and Continue" control 372 user-interface feature, the mobile computing device 304 can associate the captured photograph with the recorded video. For example, the mobile computing device 304 can establish a link (e.g., an electronic link) between the captured photograph and the recorded video. In some examples, the recorded video may be uniquely associated with the captured photograph, for example as provided by the link between the captured photograph and the recorded video. In some examples, the link between the captured photograph and the recorded video can be later used to identify the recorded video (e.g., from a collection of several recorded videos) based on the captured photograph or on information associated with the captured photograph, for example. In some examples, the captured photograph and the recorded video can be included in a single file, while in other examples the captured photograph and the recorded video can be included in separate files.

The mobile computing device 304 may additionally provide the captured photograph and the recorded video to a computer system, such as the computer system 104 (see FIG. 1A), in response to the received input indicating that the user desires to save and continue. The mobile computing device 304 may transmit, for receipt by the computer system, the captured photograph and the recorded video. In some examples, in addition to providing the captured photograph and the recorded video, the mobile computing device 304 can provide additional information, such as information regarding the association of the captured photograph with the recorded video, or additional information regarding the captured photograph, the recorded video, the mobile computing device 304, or an account associated with the mobile computing device.

In some examples, the computer system (e.g., computer system 104) may provide the mobile computing device 304 with information relating to print media items, and the mobile computing device 304 may receive the information. For example, the computer system may transmit information regarding print media options, print media item information, or information pertaining to a portion of the print media item. In some examples, the received information can include a template for the print media item. In some examples, the information can include checkout or ordering information. The mobile computing device may present the information on its display screen. For example, the mobile computing device may present an image of the print media item.

In some examples, the mobile computing device may receive one or more inputs regarding the presented information. In some examples, the mobile computing device may receive (e.g., from the user) one or more inputs relating to print media edit information, such as text or other information (e.g., image, graphic) that the user wishes to add to the print media item, and may display the received text or other information on the displayed print media item. In some examples, the mobile computing device may provide information to one or more computer systems regarding the received inputs.

FIG. 8 depicts an example mobile computing device displaying a screen shot of an example user interface 400 through which a user may view and edit a print media item 401 that includes a photograph 402. The print media item 401 is a coffee cup in this example (but in other examples could be any of the various print media items discussed herein), and the photograph 402 may correspond to the pre-cropped, high-resolution photograph that was captured prior to recording the video, described above with reference to FIG. 5A. The pre-cropped, high-resolution photograph 402 has been included at the location of the photograph placeholder of the print media item.

The representation of the pre-cropped, high-resolution photograph 402 may meet the expectations of the user, for example because the photograph 402 includes an aspect ratio that matches the aspect ratio of the cropped camera viewer 312 (see FIG. 5A) that the user viewed while the photograph was being captured. As such, the photograph 402 presented with the print media item 401 in FIG. 8 may include as aspect of familiarity, which may provide confidence to the user that the photograph 402 has not been distorted or altered in an unexpected manner (e.g., by changing an aspect ratio) versus what the user viewed on the device while the photograph was being captured. In this example, the aspect ratio of the photograph 402 and of the cropped camera viewer 312 (see FIG. 5A) is about 3:4.

In the depicted example, a size of the photograph 402 is smaller than a size of the cropped camera viewer 312 (see FIG. 5A). In other examples, the size of the photograph 402 may be substantially similar to the size of the cropped camera viewer 312. In still other examples, the size of the photograph 402 may be larger than the size of the cropped camera viewer 312.

In some examples, a user may select one or more areas of the print media item 401 to make changes or edits to the print media item. For example, a user may select an area 404 to add text to the print media item, such as to provide personalized message.

FIG. 9 depicts an example mobile computing device displaying a screen shot of an example user interface 420 through which a user may make a change to a print media item. The user has selected to add text to the print media item, such as "Summer 2015," and a keyboard 422 through which the user may enter the text may be provided on the screen 303 of the device 304. The entered text may be presented in a text entry area 424, for example. In some examples, the user may be able to alter an arrangement of the print media item. For example, the user may be able to reposition the photograph 402 to an alternative location on the print media item, or reposition or change text or graphics on the print media item.

Figure 10:
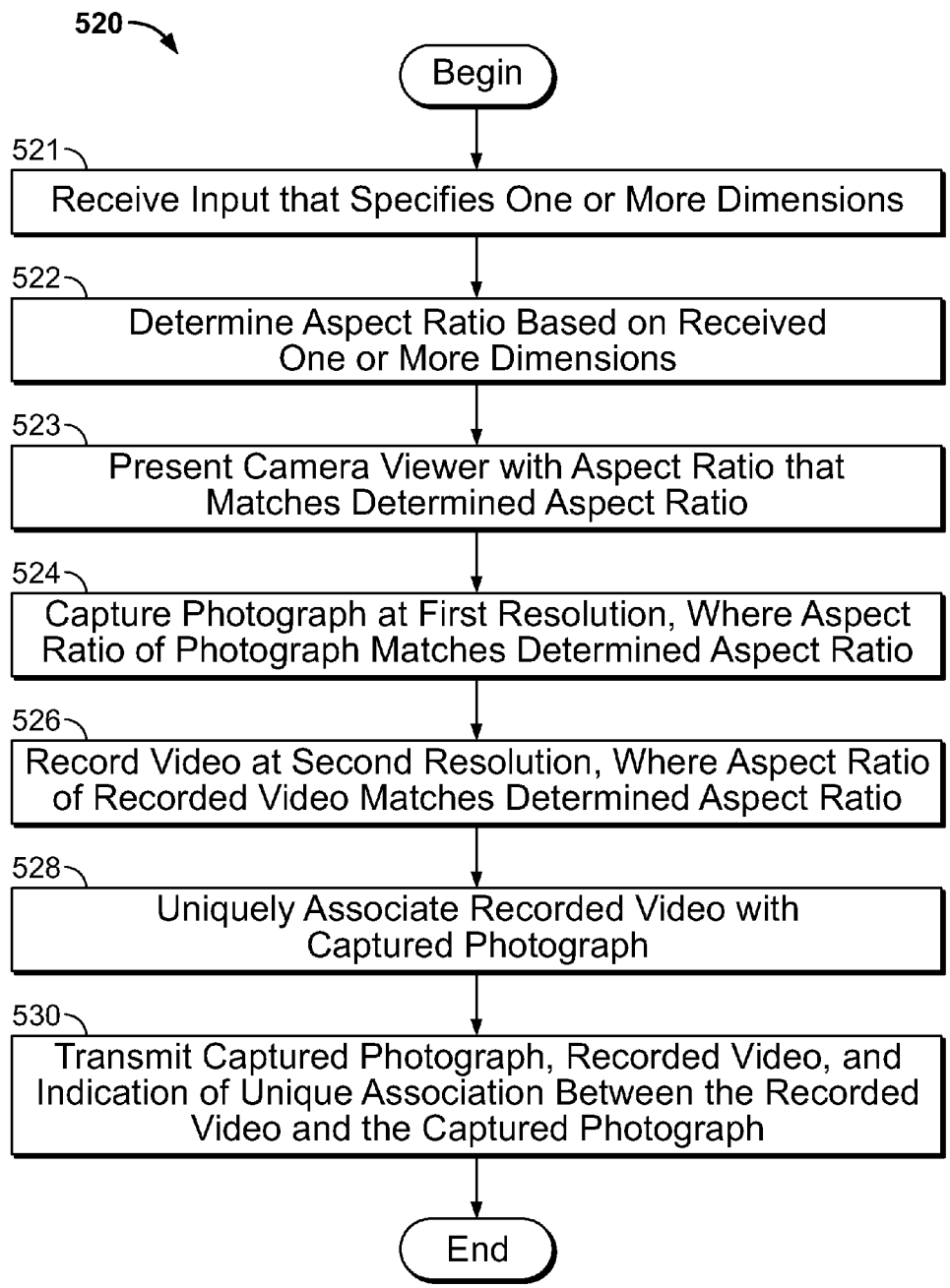
FIG. 10 is a flowchart of an example technique for acquiring electronic content for an augmented reality print media item.

FIG. 10 is a flowchart of an example technique 520 for acquiring electronic content for an augmented reality print media item. The example technique 520 can be performed by a mobile computing device that includes a camera. Examples of mobile computing devices that may perform the technique include a smartphone, a tablet-computing device, or any of the various mobile computing devices discussed herein.

At a first step 521, a mobile computing device receives an input that specifies one or more dimensions. The one or more dimensions may be dimensions for a photograph to be included with a print media item, for example, or for a photograph placeholder in a print media item template. In some examples, an input describing a shape of the photograph to be included with the print media item may also be received at step 521. Examples of such shapes can include a square, rectangle, ellipse, circle, triangle, quadrilateral, heart, star, and diamond, to list just a few examples. Other shapes can also be used. In some examples, a user may select from a list of predetermined shapes.

At step 522, the mobile computing device determines an aspect ratio based on the received input that specifies one or more dimensions. For example, based on the received one or more dimensions, the mobile computing device may determine a relationship between a width and a height. In some examples, the mobile computing device may determine a proportional relationship between the width and the height. The determined aspect ratio may correspond to an aspect ratio for the photograph to be included with the print media item. In some examples, the mobile computing device may determine the aspect ratio based solely on the one or more dimensions received at step 521. In some examples, the mobile computing device may determine the aspect ratio based on the one or more dimensions received and additionally based on properties of a shape, where in some examples an input that specifies a shape is also received at step 521. In some examples, the mobile computing device may determine the aspect ratio based on the one or more dimensions received at step 521 and on additional information, such as information previously stored at the mobile computing device or received from an external computer system, for example.

At step 523, the mobile computing device presents, on a display screen of the mobile computing device, a camera viewer, where an aspect ratio of the camera viewer matches the determined aspect ratio. The aspect ratio may correspond to an aspect ratio of a photograph to be included with a print media item, for example, or for a photograph placeholder in a print media item template. The presented camera viewer may be a cropped camera viewer, where the viewer is cropped to provide an aspect ratio of the viewer based on the determined aspect ratio. In some examples, the camera viewer presents a view based on light collected by a lens of the camera. In some examples, the mobile computing device presents, on the display screen of the mobile computing device, a shaded view at a display intensity that is less than a display intensity of the camera viewer. In some examples, the shaded view surrounds the camera viewer, and in some examples that shaded view includes a portion above the camera viewer and a portion below the camera viewer. In some examples, the camera viewer occupies an area of the display screen that is less than an entire area of the display screen. In some examples, the camera viewer occupies an area of the display screen that is less than half of the entire area of the display screen.

At step 524, the mobile computing device captures, using the camera of the mobile computing device, a photograph at a first resolution, where an aspect ratio of the captured photograph matches the determined aspect ratio (determined at step 522, e.g.). As such, the aspect ratio of the captured photograph may match the aspect ratio of the camera viewer, and the aspect ratio of a photograph to be included with a print media item, for example, or for a photograph placeholder in a print media item template.

At step 526, the mobile computing device records, using the camera of the mobile computing device, a video at a second resolution that is lower than the first resolution, where an aspect ratio of the recorded video matches the determined aspect ratio (determined at step 522, e.g.). As such, the aspect ratio of the recorded video may match the aspect ratio of the camera viewer and the aspect ratio of the captured photograph (captured at step 524, e.g.), and the aspect ratio of a photograph to be included with a print media item, for example, or for a photograph placeholder in a print media item template. In some examples, the photograph is captured before the video is recorded. In some examples, the recorded video comprises a plurality of individual frames of the video, and the captured photograph is different from each frame of the plurality of individual frames of the video.

At step 528, the mobile computing device uniquely associates the recorded video with the captured photograph. In some examples, the mobile computing device presents a preview of the captured photograph or a preview of the recorded video (or both) on the display screen of the mobile computing device. In some examples, the mobile computing device presents on the display screen a preview of a print media item (e.g., based on a print media item template), where the print media item includes the captured photograph.

At step 530, the mobile computing device transmits, for receipt by a remote computer system, the captured photograph at the first resolution, the recorded video at the second resolution, and an indication of the unique association between the recorded video and the captured photograph.

Referring again to FIG. 3A, a user may select a second area 305 of the user interface 300 (labeled "Scan a Print Media Item"), and the mobile computing device may receive the selection as a scan input. In some implementations, receipt of a scan input may indicate that the user desires to scan an augmented reality print media item in anticipation of being presented an augmented reality experience. In response to receiving the scan input, the mobile computing device 304 may scan a print media item, or a portion of a print media item.

FIG. 11 depicts an example mobile computing device displaying a screen shot of an example user interface 600, through which a user may initiate scanning of a print media item 602 or a portion (e.g., a photograph 604) of the print media item 602. For example, a user may use the mobile computing device 304 to scan a physical print media item or a photograph on a physical print media item. A scan window 606 may be presented on the display screen 303 of the mobile computing device 304. The scan window 606 may be a camera viewer, according to some implementations. In the depicted example, the print media item 602 is a coffee cup, but in other examples the print media item could be any of the print media items discussed herein. The print media item 602 includes a photograph 604, and is shown in the scan window 606. For example, a lens of the camera of the device may be pointed towards the physical print media item, and the device may present the view of the print media item 602 (or a portion of the print media item 602) in the scan window 606.

In some examples, print media item 602 may be an augmented reality print media item created using the devices, systems, and techniques discussed herein. For example, print media item 602 may be a physical print media item that includes a photograph 604 that is associated with augmented reality content, such as a video, and where the augmented reality content associated with the photograph may be presented on the mobile computing device 304 such that the augmented reality content "pops" from the photograph 604. The photograph 604 may be captured by a mobile computing device, and the associated augmented reality content (e.g., video) may be recorded by the mobile computing device, for example as described above with reference to steps B-F (122, 123, 124, 134, 136) of FIG. 1A. The photograph and the augmented reality content may be associated with one another, for example as described above with reference to step H (138) of FIG. 1A, and the print media item 602 may be created, for example as described above with reference to step M (148) of FIG. 1A.

In some examples, the scan window 606 is a cropped camera viewer and includes a generally rectangular shape. In some examples, including the example depicted in FIG. 11, the scan window 606 occupies an area that is less than the area of the entire display screen 303. In some examples, the scan window 606 occupies substantially the entire display screen 303. A shaded portion 608 (or greyed-out portion) of the display screen 303 shows, at a diminished display intensity as compared to a display intensity of the scan window 606, an environment about the print media item, and in this example shows at the diminished or decreased display intensity the environment and portions of the print media item that are not included in the scan window 606. In this example, the shaded portion 608 includes a left portion and a right portion. In some examples, the shaded portion can surround the scan window 606 (not shown in FIG. 11).

In some examples, a user may tap the image of the print media item displayed in the scan window 606 to provide a begin scan input for initiating a scan, and the mobile computing device 304 may receive the begin scan input. The mobile computing device 304 may then scan the print media item 602. In some examples, the mobile computing device 304 scans the photograph 604 of the print media item 602. There are many options for scanning the print media item 602 or the photograph 604 of the print media item 602. In some examples, the mobile computing device 304 captures an image of the print media item 602 or of the photograph 604 of the print media item 602. In some examples, the mobile computing device 304 is configured to process and scan the captured image.

In some examples, the mobile computing device 304 provides information from the scan of the print media item or the photograph of the print media item to a computer system (e.g., computer system 104, see FIG. 1A), such as a computer system located remotely from the mobile computing device 304. The computer system may receive the information and use the information to identify a photograph previously received from a mobile computing device. The identified photograph may be associated with augmented reality content (e.g., via a link), and the computer system may identify the augmented reality content (e.g., a video) based on the association between the photograph and the augmented reality content. The computer system may provide the augmented reality content to the mobile computing device 304, according to some implementations. In some examples, the computer system may also provide information regarding presentation of the augmented reality content, such as information pertaining to how to present the augmented reality content with respect to the photograph 604 on the print media item 602.

FIG. 12 depicts an example mobile computing device displaying a screen shot of an example user interface 620 that can be used to present an augmented reality experience. In various implementations, the mobile computing device 304 may receive augmented reality content that is associated with the print media item 602 (e.g., associated with a photograph of the print media item), as described above herein. In some examples, upon receipt of the augmented reality content (e.g., a video), the mobile computing device 304 may present the augmented reality content on the display screen 303 of the mobile computing device 304. The mobile computing device may present the augmented reality content in a manner such that it appears to "pop" or spring from the photograph on the print media item. For example, a video may be presented such that the subjects of the video initially align with the subjects of the photograph of the print media item. When the video begins to play, it may appear that the subjects of the photograph "come to life" and begin interacting with the user, for example. In some examples, the mobile computing device 304 may present the augmented reality content after receipt of a user input, such as a user selection of a user interface feature.

Computing devices and computer systems described in this document that may be used to implement the systems, techniques, machines, and/or apparatuses can operate as clients and/or servers, and can include one or more of a variety of appropriate computing devices, such as laptops, desktops, workstations, servers, blade servers, mainframes, mobile computing devices (e.g., PDAs, cellular telephones, smartphones, and/or other similar computing devices), computer storage devices (e.g., Universal Serial Bus (USB) flash drives, RFID storage devices, solid state hard drives, hard-disc storage devices), and/or other similar computing devices. For example, USB flash drives may store operating systems and other applications, and can include input/output components, such as wireless transmitters and/or USB connector that may be inserted into a USB port of another computing device.

Such computing devices may include one or more of the following components: processors, memory (e.g., random access memory (RAM) and/or other forms of volatile memory), storage devices (e.g., solid-state hard drive, hard disc drive, and/or other forms of non-volatile memory), high-speed interfaces connecting various components to each other (e.g., connecting one or more processors to memory and/or to high-speed expansion ports), and/or low speed interfaces connecting various components to each other (e.g., connecting one or more processors to a low speed bus and/or storage devices). Such components can be interconnected using various busses, and may be mounted across one or more motherboards that are communicatively connected to each other, or in other appropriate manners. In some implementations, computing devices can include pluralities of the components listed above, including a plurality of processors, a plurality of memories, a plurality of types of memories, a plurality of storage devices, and/or a plurality of buses. A plurality of computing devices can be connected to each other and can coordinate at least a portion of their computing resources to perform one or more operations, such as providing a multi-processor computer system, a computer server system, and/or a cloud-based computer system.

Processors can process instructions for execution within computing devices, including instructions stored in memory and/or on storage devices. Such processing of instructions can cause various operations to be performed, including causing visual, audible, and/or haptic information to be output by one or more input/output devices, such as a display that is configured to output graphical information, such as a graphical user interface (GUI). Processors can be implemented as a chipset of chips that include separate and/or multiple analog and digital processors. Processors may be implemented using any of a number of architectures, such as a CISC (Complex Instruction Set Computers) processor architecture, a RISC (Reduced Instruction Set Computer) processor architecture, and/or a MISC (Minimal Instruction Set Computer) processor architecture. Processors may provide, for example, coordination of other components computing devices, such as control of user interfaces, applications that are run by the devices, and wireless communication by the devices.

Memory can store information within computing devices, including instructions to be executed by one or more processors. Memory can include a volatile memory unit or units, such as synchronous RAM (e.g., double data rate synchronous dynamic random access memory (DDR SDRAM), DDR2 SDRAM, DDR3 SDRAM, DDR4 SDRAM), asynchronous RAM (e.g., fast page mode dynamic RAM (FPM DRAM), extended data out DRAM (EDO DRAM)), graphics RAM (e.g., graphics DDR4 (GDDR4), GDDR5). In some implementations, memory can include a non-volatile memory unit or units (e.g., flash memory). Memory can also be another form of computer-readable medium, such as magnetic and/or optical disks.

Storage devices can be capable of providing mass storage for computing devices and can include a computer-readable medium, such as a floppy disk device, a hard disk device, an optical disk device, a Microdrive, or a tape device, a flash memory or other similar solid state memory device, or an array of devices, including devices in a storage area network or other configurations. Computer program products can be tangibly embodied in an information carrier, such as memory, storage devices, cache memory within a processor, and/or other appropriate computer-readable medium. Computer program products may also contain instructions that, when executed by one or more computing devices, perform one or more methods or techniques, such as those described above.

High speed controllers can manage bandwidth-intensive operations for computing devices, while the low speed controllers can manage lower bandwidth-intensive operations. Such allocation of functions is exemplary only. In some implementations, a high-speed controller is coupled to memory, display 616 (e.g., through a graphics processor or accelerator), and to high-speed expansion ports, which may accept various expansion cards; and a low-speed controller is coupled to one or more storage devices and low-speed expansion ports, which may include various communication ports (e.g., USB, Bluetooth, Ethernet, wireless Ethernet) that may be coupled to one or more input/output devices, such as keyboards, pointing devices (e.g., mouse, touchpad, track ball), printers, scanners, copiers, digital cameras, microphones, displays, haptic devices, and/or networking devices such as switches and/or routers (e.g., through a network adapter).

Displays may include any of a variety of appropriate display devices, such as TFT (Thin-Film-Transistor Liquid Crystal Display) displays, OLED (Organic Light Emitting Diode) displays, touchscreen devices, presence sensing display devices, and/or other appropriate display technology. Displays can be coupled to appropriate circuitry for driving the displays to output graphical and other information to a user.

Expansion memory may also be provided and connected to computing devices through one or more expansion interfaces, which may include, for example, a SIMM (Single In Line Memory Module) card interfaces. Such expansion memory may provide extra storage space for computing devices and/or may store applications or other information that is accessible by computing devices. For example, expansion memory may include instructions to carry out and/or supplement the techniques described above, and/or may include secure information (e.g., expansion memory may include a security module and may be programmed with instructions that permit secure use on a computing device).

Computing devices may communicate wirelessly through one or more communication interfaces, which may include digital signal processing circuitry when appropriate. Communication interfaces may provide for communications under various modes or protocols, such as GSM voice calls, messaging protocols (e.g., SMS, EMS, or MMS messaging), CDMA, TDMA, PDC, WCDMA, CDMA2000, GPRS, 4G protocols (e.g., 4G LTE), and/or other appropriate protocols. Such communication may occur, for example, through one or more radio-frequency transceivers. In addition, short-range communication may occur, such as using a Bluetooth, Wi-Fi, or other such transceivers. In addition, a GPS (Global Positioning System) receiver module may provide additional navigation- and location-related wireless data to computing devices, which may be used as appropriate by applications running on computing devices.

Computing devices may also communicate audibly using one or more audio codecs, which may receive spoken information from a user and convert it to usable digital information. Such audio codecs may additionally generate audible sound for a user, such as through one or more speakers that are part of or connected to a computing device. Such sound may include sound from voice telephone calls, may include recorded sound (e.g., voice messages, music files, etc.), and may also include sound generated by applications operating on computing devices.

Computing devices can also include one or more sensors through which various states of and around the computing devices can be detected. For example, computing devices can include one or more accelerometers that can be used to detect motion of the computing devices and details regarding the detected motion (e.g., speed, direction, rotation); one or more gyroscopes that can be used to detect orientation of the computing devices in 3D space; light sensors that can be used to detect levels of ambient light at or around the computing devices; touch and presence sensors that can be used to detect contact and/or near-contact with one or more portions of the computing devices; environmental sensors (e.g., barometers, photometers, thermometers) that can detect information about the surrounding environment (e.g., ambient air temperature, air pressure, humidity); other motion sensors that can be used to measure acceleration and rotational forces (e.g., gravity sensors, rotational vector sensors); position sensors that can be used to detect the physical position of the computing devices (e.g., orientation sensors, magnetometers), and/or other appropriate sensors.

Various implementations of the systems, devices, and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) can include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., LCD display screen, LED display screen) for displaying information to users, a keyboard, and a pointing device (e.g., a mouse, a trackball, touchscreen) by which the user can provide input to the computer. Other kinds of devices can be used to provide for interaction with a user as well; for example, feedback provided to the user can be any form of sensory feedback (e.g., visual feedback, auditory feedback, and/or tactile feedback); and input from the user can be received in any form, including acoustic, speech, and/or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

The above description provides examples of some implementations. Other implementations that are not explicitly described above are also possible, such as implementations based on modifications and/or variations of the features described above. For example, the techniques described above may be implemented in different orders, with the inclusion of one or more additional steps, and/or with the exclusion of one or more of the identified steps. Additionally, the steps and techniques described above as being performed by some computing devices and/or systems may alternatively, or additionally, be performed by other computing devices and/or systems that are described above or other computing devices and/or systems that are not explicitly described. Similarly, the systems, devices, and apparatuses may include one or more additional features, may exclude one or more of the identified features, and/or include the identified features combined in a different way than presented above. Features that are described as singular may be implemented as a plurality of such features. Likewise, features that are described as a plurality may be implemented as singular instances of such features. The drawings are intended to be illustrative and may not precisely depict some implementations. Variations in sizing, placement, shapes, angles, and/or the positioning of features relative to each other are possible.

What is claimed is:

1. A computer-implemented method of acquiring electronic content to be used with print media, comprising:
    receiving, at a mobile computing device that includes a camera, an input that specifies one or more dimensions for a photograph to be included with a print media item;
    determining an aspect ratio based on the received input and presenting, on a display screen of the mobile computing device, a camera viewer with an aspect ratio that matches the determined aspect ratio;
    capturing, via the camera of the mobile computing device, a photograph at a first resolution, wherein an aspect ratio of the captured photograph matches the determined aspect ratio;
    recording, via the camera of the mobile computing device, a video at a second resolution that is lower than the first resolution, wherein an aspect ratio of the recorded video matches the determined aspect ratio;
    uniquely associating the recorded video with the captured photograph; and
    transmitting, for receipt by a remote computer system, the captured photograph at the first resolution, the recorded video at the second resolution, and an indication of the unique association between the recorded video and the captured photograph, via a transmitter of the mobile computing device.

2. The computer-implemented method of claim 1, further comprising presenting a preview of the captured photograph on the display screen of the mobile computing device.

3. The computer-implemented method of claim 1, wherein the one or more dimensions includes a height and a width for the photograph to be included with the print media item.

4. The computer-implemented method of claim 1, wherein the video comprises a plurality of individual frames of the video, and wherein the captured photograph is different from each frame of the plurality of individual frames of the video.

5. The computer-implemented method of claim 1, wherein the captured photograph is captured before the video is recorded.

6. The computer-implemented method of claim 1, wherein the recorded video is uniquely associated with the captured photograph based on a naming convention.

7. The computer-implemented method of claim 1, wherein the camera viewer has a rectangular shape.

8. The computer-implemented method of claim 1, further comprising receiving a second input that specifies a shape for the photograph to be included in the print media item.

9. The computer-implemented method of claim 8, wherein the shape is selected from the group consisting of square, rectangle, ellipse, circle, triangle, quadrilateral, heart, star, and diamond.

10. The computer-implemented method of claim 1, wherein the print media item is selected from the group consisting of magazine, newspaper, journal, book, brochure, article of clothing, coffee mug, calendar, greeting card, postcard, poster, and business card.

11. The computer-implemented method of claim 1, further comprising presenting, on the display screen of the mobile computing device, a shaded view at a display intensity that is less than a display intensity of the camera viewer.

12. The computer-implemented method of claim 1, wherein the camera viewer occupies an area of the display screen that is less than an entire area of the display screen.

13. The computer-implemented method of claim 1, wherein the aspect ratio of the camera viewer is different from an aspect ratio of the display screen.

14. The computer-implemented method of claim 1, further comprising receiving a third input that specifies an edit to the recorded video, and editing the recorded video based on the third input.

15. A computer-implemented method of acquiring electronic content to be used with a print media, comprising:
    receiving, at a mobile computing device that includes a camera, i) a first input that specifies a height for a photograph to be included with a print media item, and ii) a second input that specifies a width for the photograph to be included with the print media item;
    determining an aspect ratio based on the received first and second inputs and presenting, on a display screen of the mobile computing device, a camera viewer with an aspect ratio that matches the determined aspect ratio;
    capturing, via the camera of the mobile computing device, a photograph at a first resolution, wherein an aspect ratio of the captured photograph matches the determined aspect ratio;
    recording, via the camera of the mobile computing device, a video at a second resolution that is lower than the first resolution, wherein an aspect ratio of the recorded video matches the determined aspect ratio;
    uniquely associating the recorded video with the captured photograph; and
    transmitting, for receipt by a remote computer system, the captured photograph at the first resolution, the recorded video at the second resolution, and an indication of the unique association between the recorded video and the captured photograph, via a transmitter of the mobile computing device.

16. The computer-implemented method of claim 15, wherein the camera viewer has a rectangular shape.

17. The computer-implemented method of claim 15, further comprising receiving a second input that specifies a shape for the photograph to be included with the print media item.

18. The computer-implemented method of claim 17, wherein the shape is selected from the group consisting of square, rectangle, ellipse, circle, triangle, quadrilateral, heart, star, and diamond.

19. The computer-implemented method of claim 15, wherein the video comprises a plurality of individual frames of the video, and wherein the captured photograph is different from each frame of the plurality of individual frames of the video.

20. The computer-implemented method of claim 15, wherein the captured photograph is captured before the video is recorded.

* * * * *